US009218741B2

(12) United States Patent
Wu et al.

(10) Patent No.: US 9,218,741 B2
(45) Date of Patent: Dec. 22, 2015

(54) SYSTEM AND METHOD FOR AIRCRAFT NAVIGATION BASED ON DIVERSE RANGING ALGORITHM USING ADS-B MESSAGES AND GROUND TRANSCEIVER RESPONSES

(71) Applicant: SAAB-SENSIS CORPORATION, East Syracuse, NY (US)

(72) Inventors: Ryan Haoyun Wu, Manlius, NY (US); Elyahu Perl, Dewitt, NY (US)

(73) Assignee: Saab-Sensis Corporation, East Syracuse, NY (US)

( * ) Notice: Subject to any disclaimer, the term of this patent is extended or adjusted under 35 U.S.C. 154(b) by 456 days.

(21) Appl. No.: 13/839,303

(22) Filed: Mar. 15, 2013

(65) Prior Publication Data

US 2015/0331099 A1   Nov. 19, 2015

Related U.S. Application Data

(60) Provisional application No. 61/621,098, filed on Apr. 6, 2012, provisional application No. 61/639,418, filed on Apr. 27, 2012, provisional application No. 61/645,856, filed on May 11, 2012, provisional application No. 61/662,067, filed on Jun. 20, 2012.

(51) Int. Cl.
*G08G 5/00* (2006.01)
*G01S 13/78* (2006.01)
*G01S 13/76* (2006.01)
*G01S 13/87* (2006.01)

(52) U.S. Cl.
CPC .......... *G08G 5/0013* (2013.01); *G01S 13/767* (2013.01); *G01S 13/781* (2013.01); *G01S 13/878* (2013.01); *G08G 5/0008* (2013.01); *G08G 5/0078* (2013.01)

(58) Field of Classification Search
CPC ................................... G08G 5/0013
See application file for complete search history.

(56) References Cited

U.S. PATENT DOCUMENTS

| | | | |
|---|---|---|---|
| 8,559,971 B1 * | 10/2013 | Garcia et al. ............... | 455/456.1 |
| 8,791,861 B2 * | 7/2014 | Garcia et al. ............... | 342/464 |
| 2008/0211709 A1 | 9/2008 | Smith et al. | |
| 2011/0156878 A1 | 6/2011 | Wu et al. | |
| 2012/0162014 A1 | 6/2012 | Wu et al. | |

FOREIGN PATENT DOCUMENTS

| | | | |
|---|---|---|---|
| WO | 2010/138696 A1 | 12/2010 | |
| WO | 2011/009109 A2 | 1/2011 | |
| WO | 2011/011360 A1 | 1/2011 | |

OTHER PUBLICATIONS

International Search Report and Written Opinion, International Application No. PCT/US2013/035420, dated Apr. 22, 2014 (13 pages).

* cited by examiner

*Primary Examiner* — Matthew M Barker
(74) *Attorney, Agent, or Firm* — Burr & Brown, PLLC

(57) ABSTRACT

A method of aircraft navigation via receiving signals emitted by other aircraft and corresponding reply message transmitted by ground transceivers and the using a new diverse-ranging algorithm that solves for the positions of a eavesdropping aircraft and the positions of direct-reply aircraft emitting the signals received by the eavesdropping aircraft.

37 Claims, 15 Drawing Sheets

Echoed Pseudo Range (EPR) equation $$EPR = C(t_N - \tau_N - t_0) = $$
$$\sqrt{(x_a - x_N)^2 + (y_a - y_N)^2 + (z_a - z_N)^2} +$$
$$\sqrt{(x_N - x_b)^2 + (y_N - y_b)^2 + (z_N - z_b)^2}$$

Pseudo Range (PR) equation $$PR = C(t_b - t_0) = $$
$$\sqrt{(x_a - x_b)^2 + (y_a - y_b)^2 + (z_a - z_b)^2}$$

Round-trip Range (RTR) equation $$RTR = C(T_N - \tau_N - t_0) = $$
$$\sqrt{(x_N - x_b)^2 + (y_N - y_b)^2 + (z_N - z_b)^2}$$

EPR − PR Equation

⇩

TDOA Equation with foci at $\overline{P}_b$ and $\overline{P}_N$
and $\overline{P}_a$ on the hyperboloid $$C(t_N - \tau_N - t_b) - \sqrt{(x_N - x_b)^2 + (y_N - y_b)^2 + (z_N - z_b)^2}$$
$$= \sqrt{(x_a - x_N)^2 + (y_a - y_N)^2 + (z_a - z_N)^2} -$$
$$\sqrt{(x_a - x_b)^2 + (y_a - y_b)^2 + (z_a - z_b)^2}$$

SYSTEM AND METHOD FOR AIRCRAFT NAVIGATION BASED ON DIVERSE RANGING ALGORITHM USING ADS-B MESSAGES AND GROUND TRANSCEIVER RESPONSES

FIELD OF THE INVENTION

The present invention relates to the field of providing aircraft positioning, navigation, timing, and validation service and capability in lieu of functioning Global Positioning System (GPS) using ground transceivers and Automatic Dependent Surveillance-Broadcast (ADS-B) equipped aircraft.

BACKGROUND OF THE INVENTION

For migrating aircraft navigation and the independent position determination of aircraft from the traditional navigational aids (NAVAIDS), such as VHF Omni-direction Range (VOR) and Distance Measuring Equipment (DME), Air Navigation Service Providers (ANSPs) are moving toward performance based navigation (PBN) that is largely based and dependent on GPS to provide highly accurate positioning capability to aircraft. The high positioning accuracy of a GPS navigation-based system makes possible more efficient flight procedures such as the Area Navigation (RNAV) as well as Required Navigation Performance (RNP) procedures to be designed and implemented in the air space. Such new procedures make more efficient use of limited airspace, thereby improving the operational efficiency and capacity of the airspace over the existing air transportation systems. The use of GPS as a navigation source is also used by the automatic dependent surveillance-broadcast (ADS-B) system, which broadcasts aircraft position information from ADS-B equipped aircraft that is received by aircraft near the transmitting ADS-B equipped aircraft and ground air traffic control (ATC) stations. With ADS-B providing surveillance information to ATC, traditional Secondary Surveillance Radar (SSR) is no longer necessary as a primary surveillance system and is only used as a back-up surveillance means to the GPS-based ADS-B system.

However, reliance on GPS for providing both the navigation and surveillance services to the airspace is being recognized as having a significant risk due to the vulnerable nature of GPS signals. Specifically, the signals transmitted by GPS satellites are very low in power, so GPS receivers can be easily interfered or jammed by intentional or non-intentional radio frequency interference (RFI) sources, which causes the GPS receivers to stop functioning correctly. For example, an RFI source capable of interfering with/jamming GPS signals is available and can be purchased via internet merchandising at low cost, making it a real threat to the integrity of future aircraft navigation and surveillance systems.

Due to the vulnerability of GPS and the dependence of air navigation and surveillance system on GPS, an alternative means of navigation that is not dependent on GPS signals is needed.

Existing means of alternative navigation include DME/DME navigation, in which aircraft interrogates simultaneously multiple ground DME transponders and measures the ranges to the transponders. The position of the aircraft is then calculated using range-range positioning algorithms (as illustrated in FIG. 2). This method is a suitable alternative navigation system for aircraft equipped with an DME multi-channel scanner system but is not an economically feasible solution for non-commercial general aviation aircraft users. Additionally, because of the limited ranging accuracy provided by the DME system and limited coverage of existing ground DME transponder network, DME/DME is mostly suitable for RNAV-2 nautical miles (NM) operations, where the 2 NM means a horizontal position Total System Error does not exceed 2 NM 95% of the time. While RNAV-2 NM is sufficient for en-route operations, it is not sufficient for terminal operations where RNAV-1 NM or better is usually required. For some terminal operations. RNP capability is further required. To achieve RNP performance, redundant measurements are generally required for computing the integrity of the solution. The need for integrity poses higher demands on the DME infrastructure as well as DME/DME avionics. Because of this, it is not common to have DME/DME RNP better than 1 NM. Therefore, a more capable means of alternative navigation other than DME/DME is still needed.

Existing certified means to provide position information to ADS-B avionics are based on GPS or Wide-area Augmentation System (WAAS) due to highly stringent accuracy and integrity requirements of ADS-B. Since WAAS is part of the Global Navigation Satellite System (GNSS) and is also vulnerable to jamming and spoofing like GPS, and DME/DME does not meet the stringent accuracy and integrity requirements, a backup position source able to meet ADS-B requirements is still needed.

In addition, signal spoofing or fake signal broadcasting on the GPS frequencies as well as ADS-B frequencies can seriously impact the safety and efficiency of aircraft operations in the national airspace system (NAS). Therefore, what is needed is a more resilient alternative means of positioning and navigation as well as means to validate navigational and positional information, which is vital to aircraft operations in the NAS when GPS is unavailable or is spoofed.

SUMMARY OF THE INVENTION

According to a first aspect of the present invention, there is provided a method of aircraft navigation and dependent surveillance using at least one broadcast message, the method comprising the steps of transmitting and recording the transmission time of a first broadcast message at a first aircraft of a plurality of aircraft, the first broadcast message comprising at least identity information of the first aircraft, receiving and recording the receiving time of the first broadcast message from the first aircraft at a plurality of ground transceivers and at a second aircraft, transmitting a reply message to the first broadcast message from each of the plurality of ground transceivers, wherein each reply message comprises at least the ground transceiver's identity and a delay time from receiving the first broadcast message to transmitting the reply message for that ground transceiver, and receiving and recording the receiving time of the reply messages transmitted by each of the plurality of ground transceivers at the first aircraft and the second aircraft. The method further comprises the steps of determining a first position of the first aircraft on the first aircraft from at least the transmission time data for the first broadcast message, the receiving time data and the delay time for each of the received reply messages and the positions of each of the plurality of ground transceivers, determining a second position of the first aircraft and a first position of the second aircraft on the second aircraft from at least the receiving time data for the first broadcast message, the receiving time data and the delay time for each of the received reply messages, and the positions of each of the plurality of ground transceivers, transmitting a second broadcast message from the first aircraft comprising at least the identity information and the first position of the first aircraft, receiving the second broadcast message at the second aircraft, determining a second position of the second aircraft on the second aircraft from at least the receiving time data for the first broadcast message, the receiving time data and the delay time for each of the received reply messages, the positions of each of the plurality of ground transceivers, and the first position of the first aircraft contained in the second broadcast message, and transmitting a third broadcast message from the second aircraft comprising at least identity information and at least one of the first position and the second position of the second aircraft.

In one embodiment, the step of determining the first position of the first aircraft on the first aircraft further comprises the steps of transmitting a broadcast message from each of at least one other aircraft, wherein the at least one other aircraft is not one of the first and second aircraft, receiving and recording the receiving time of the broadcast message from each of the at least one aircraft at a plurality of ground transceivers and at the first aircraft, transmitting a reply message to the broadcast message of each of the at least one other aircraft from the plurality of ground transceivers, wherein each reply message comprises at least ground transceiver identity and a delay time from receiving the broadcast message to transmitting the reply message for that ground transceiver; and determining the first position of the first aircraft on the first aircraft from at least the transmission time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, and the positions of each of the plurality of ground transceivers.

In another embodiment, the step of determining the second position of the first aircraft and the first position of the second aircraft on the second aircraft further comprises the steps of transmitting a broadcast message from each of at least one other aircraft, wherein the at least one other aircraft is not one of the first and second aircraft, receiving and recording the receiving time of the broadcast message from each of the at least one other aircraft at a plurality of ground transceivers and at the second aircraft, transmitting a reply message to the broadcast message of each of the at least one other aircraft from the plurality of ground transceivers, wherein each reply message comprises at least ground transceiver identity and a delay time from receiving the broadcast message to transmitting the reply message for that ground transceiver, and determining the second position of the first aircraft and the first position of the second aircraft on the second aircraft from at least the receiving time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, and the positions of each of the plurality of ground transceivers.

In some embodiments, the step of determining the second position of the second aircraft on the second aircraft further comprises the steps of transmitting a broadcast message from each of at least one other aircraft, each broadcast message comprising at least the identity of that aircraft, wherein the at least one other aircraft is not one of the first and second aircraft, receiving and recording the receiving time of the broadcast message from each of the at least one aircraft at a plurality of ground transceivers and at the second aircraft, transmitting a reply message to the broadcast message of each of the at least one other aircraft from the plurality of ground transceivers, wherein each reply message comprises at least ground transceiver identity and a delay time from receiving the broadcast message to transmitting the reply message for that ground transceiver, determining a first position of one of the at least one other aircraft on the one of the at least one other aircraft from at least the transmission time data for the broadcast message of the one of the at least one other aircraft, the receiving time data and the delay time for each of the received reply messages and the positions of each of the plurality of ground transceivers, transmitting a broadcast message comprising at least the identity information and the first position of the one of the at least one other aircraft from the one of the at least one other aircraft, receiving the broadcast message comprising at least the identity information and the first position of the one of the at least one other aircraft at the second aircraft, and determining the second position of the second aircraft on the second aircraft from at least the receiving time data for the first broadcast message, the receiving time data and the delay time for each of the received reply messages in responding to the first broadcast message, the positions of each of the plurality of the ground transceivers, the first position of the first aircraft contained in the second broadcast message, the receiving time data for the broadcast message comprising at least the identity of the one of the at least one other aircraft, the receiving time data and the delay time for each of the received reply messages responding to the broadcast message comprising at least the identity of the one of the at least one other aircraft, and the position of the one of the at least one other aircraft.

In one embodiment, the step of determining the first position of the first aircraft on the first aircraft further comprises the steps of determining a barometric altitude of the first aircraft using a barometric sensor, receiving at least mean-sea-level barometric pressure data from at least one ground transceiver, calculating a corrected altitude of the first aircraft using the at least mean-sea-level barometric pressure data and the determined barometric altitude of the first aircraft, determining the first position of the first aircraft on the first aircraft from at least the transmission time data for the first broadcast message, the receiving time data and the delay time for each of the received reply messages, the positions of each of the plurality of ground transceivers, and the corrected altitude of the first aircraft. In another embodiment, the step of determining the second position of the first aircraft and the first position of the second aircraft on the second aircraft further comprises the steps of determining a barometric altitude of the second aircraft using a barometric sensor, determining a barometric altitude of the first aircraft from messages transmitted by the first aircraft, receiving at least mean-sea-level barometric pressure data from at least one ground transceiver, calculating a corrected altitude for each of the first aircraft and the second aircraft using the at least mean-sea-level barometric pressure data and the determined barometric altitude for each of the first aircraft and the second aircraft, determining the second position of the first aircraft and the first position of the second aircraft on the second aircraft from at least the receiving time data for the first broadcast message, the receiving time data and the delay time for each of the received reply messages, the positions of each of the plurality of ground transceivers, and the corrected altitude data of the first aircraft and the second aircraft.

In one embodiment, the step of determining the second position of the second aircraft on the second aircraft further comprises the steps of determining a barometric altitude of the second aircraft using a barometric sensor, receiving at least mean-sea-level barometric pressure data from at least one ground transceiver, calculating a corrected altitude of the second aircraft using the at least mean-sea-level barometric pressure data and the determined barometric altitude, determining the second position of the second aircraft on the second aircraft from at least the receiving time data for the first broadcast message, the receiving time data and the delay time for each of the received reply messages, the positions of each of the plurality of ground transceivers, the first position of the first aircraft contained in the second broadcast message, and the corrected altitude of the second aircraft.

In another embodiment, the step of determining the first position of the first aircraft on the first aircraft further comprises the steps of receiving at least mean-sea-level pressure data from at least one ground transceiver, determining a corrected altitude of the first aircraft using altitude sensor data on the first aircraft and the at least mean-sea-level (MSL) pressure data received from the at least one ground transceivers, determining the corrected altitude of each of the at least one other aircraft using altitude data received from each of the at least one other aircraft and the at least MSL pressure data received from the at least one ground transceivers, determining a velocity of the first aircraft using one of velocity sensor data on the first aircraft when a valid velocity output is available from a velocity sensor and position track data when the a valid velocity sensor output is not available, determining a velocity of each of the at least one other aircraft using one of velocity data received from each of the at least one other aircraft when valid velocity data is available from the received broadcast messages and position track data when valid velocity data is not available from the received broadcast messages, determining the first position of the first aircraft on the first aircraft from at least the transmission time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, the determined velocity data of the first aircraft, and each of the at least one other aircraft, and the corrected altitude data of the first aircraft, and each of the at least one other aircraft.

In one embodiment, the step of determining the second position of the first aircraft and the first position of the second aircraft on the second aircraft further comprises the steps of receiving at least mean-sea-level pressure data from at least one ground transceiver, determining a corrected altitude of the second aircraft using altitude sensor data on the second aircraft and the at least mean-sea-level (MSL) pressure data received from the at least one ground transceiver, determining a corrected altitude of the first aircraft and each of the at least one other aircraft using altitude data received from the first aircraft and each of the at least one other aircraft from the received broadcast messages and the at least MSL pressure data received from the at least one ground transceiver, determining a velocity of the second aircraft using one of velocity sensor data on the second aircraft when a valid velocity output is available from a velocity sensor and position track data when a valid velocity sensor output is not available, determining a velocity of the first aircraft and each of the at least one other aircraft using velocity data received from the first aircraft and each of the at least one other aircraft when valid velocity data is available from the received broadcast messages and position track data when the velocity data is not available from the received broadcast messages, determining the second position of the first aircraft and the first position of the second aircraft on the second aircraft from at least the receiving time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, the determined velocity data of the first aircraft, the second aircraft, and each of the at least one other aircraft, and the corrected altitude data of the first aircraft, the second aircraft, and each of the at least one other aircraft.

In another embodiment, the step of determining the second position of the second aircraft on the second aircraft further comprises the steps of receiving at least mean-sea-level pressure data from at least one ground transceiver, determining a corrected altitude of the second aircraft using altitude sensor data on the second aircraft and the at least mean-sea-level (MSL) pressure data received from the at least one ground transceiver, determining a corrected altitude of each of the at least one other aircraft using altitude data received from each of the at least one other aircraft in the received broadcast messages and the at least MSL pressure data received from the at least one ground transceiver, determining a velocity of the second aircraft using velocity sensor data on the second aircraft when a valid velocity output is available from a velocity sensor and position track data when the velocity sensor output is not available, determining a velocity of the first aircraft and each of the at least one other aircraft using velocity data received from the first aircraft and each of the at least one other aircraft when valid velocity data is available from the received broadcast messages and position track data when the velocity data is not available from the received broadcast messages, and determining the second position of the second aircraft on the second aircraft from at least the receiving time data for the first broadcast message, the receiving time data and the delay time for each of the received reply messages in responding to the first broadcast message, the positions of each of the plurality of the ground transceivers, the first position of the first aircraft contained in the second broadcast message, the receiving time data for the broadcast message comprising at least the identity of the one of the at least one other aircraft, the receiving time data and the delay time for each of the received reply messages responding to the broadcast message comprising at least the identity of the one of the at least one other aircraft, the position of the one of the at least one other aircraft, the velocity data of the first aircraft, the second aircraft, and each of the at least one other aircraft, and the corrected altitude data of the second aircraft and each of the at least one other aircraft.

In one embodiment, the step of determining the first position of the first aircraft on the first aircraft further comprises the steps of receiving at least mean-sea-level pressure data from at least one ground transceiver, determining a corrected altitude of the first aircraft and each of the at least one other aircraft using altitude data received from the first aircraft and each of the at least one other aircraft in the received broadcast messages and the at least mean-sea-level pressure data received from the at least one ground transceiver, and determining the first position of the first aircraft and the velocity of the first aircraft and the velocity of each of the at least one other aircraft on the first aircraft from at least the transmission time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, and the corrected altitude data of the first aircraft, and each of the at least one other aircraft.

In another embodiment, the step of determining the second position of the first aircraft and the first position of the second aircraft on the second aircraft further comprises the steps of receiving at least mean-sea-level pressure data from at least one ground transceiver, determining a corrected altitude of the second aircraft using altitude sensor data on the second aircraft and the at least mean-sea-level (MSL) pressure data received from the at least one ground transceiver, determining a corrected altitude of the first aircraft and each of the at least one other aircraft using altitude data received from the first and each of the at least one other aircraft in the received broadcast messages and the at least MSL pressure data received from the at least one or more ground transceiver, and determining the second position of the first aircraft, the first position of the second aircraft, and a velocity of the first aircraft, a velocity of the second aircraft, and a velocity of each of the at least one other aircraft on the second aircraft from at least the receiving time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, and the corrected altitude data of the first aircraft, the second aircraft, and each of the at least one other aircraft.

In one embodiment, the step of determining the second position of the second aircraft on the second aircraft further comprises the steps of receiving at least mean-sea-level pressure data from at least one ground transceiver, determining a corrected altitude of the second aircraft using altitude sensor data on the second aircraft and the at least mean-sea-level (MSL) pressure data received from the at least one ground transceiver, determining a corrected altitude of each of the at least one other aircraft using altitude data received from each of the at least one other aircraft in the received broadcast messages and the at least MSL, pressure data received from the at least one ground transceiver, and determining the second position of the second aircraft, a velocity of the first aircraft, a velocity of the second aircraft, and a velocity of each of the at least one other aircraft on the second aircraft from at least the receiving time data for the first broadcast message, the receiving time data and the delay time for each of the received reply messages in responding to the first broadcast message, the positions of each of the plurality of the ground transceivers, the first position of the first aircraft contained in the second broadcast message, the receiving time data for the broadcast message comprising at least the identity of the one of the at least one other aircraft, the receiving time data and the delay time for each of the received reply messages responding to the broadcast message comprising at least the identity of the one of the at least one other aircraft, the position of the one of the at least one other aircraft, and the corrected altitude data of the first aircraft, the second aircraft, and each of the at least one other aircraft.

In some embodiments, the step of determining the first position of the first aircraft on the first aircraft further comprises determining a velocity of the first aircraft and a velocity of each of the at least one other aircraft. In one embodiment, the step of determining the second position of the first aircraft and the first position of the second aircraft on the second aircraft further comprises determining a velocity of the first aircraft, a velocity of the second aircraft, and a velocity of each of the at least one other aircraft. In another embodiment, the step of determining the second position of the first aircraft and the first position of the second aircraft on the second aircraft further comprises determining a velocity of the first aircraft, a velocity of the second aircraft, and a velocity of each of the at least one other aircraft.

In some embodiments, the step of transmitting a reply message to the first broadcast message from each of the plurality of ground transceivers further comprises the steps of incrementing a message counter value for each reply message transmitted, recording a delay time of each reply message transmitted and associating the delay time with the message counter value, adding to the reply message a first message counter value associated with a current reply message, adding to the reply message a delay time and a second message counter value of the reply message that is associated with the delay time.

In one embodiment, the step of receiving and recording the receiving time of the reply messages transmitted by each of the plurality of ground transceivers at the first aircraft and the second aircraft further comprises the steps of determining the clock frequency offset and frequency drift of each of the first aircraft and the second aircraft using at least one of GPS position data and GPS pulse-per-second (PPS) data when GPS is available, and correcting the recorded receiving time of the reply messages on the first aircraft using the determined clock frequency offset, clock frequency drift, and the recorded time of transmission of the first broadcast message.

In one embodiment, the step of determining the first position of the first aircraft on the first aircraft further comprises determining an integrity radius and an integrity level of the determined first position, performing fault detection when at least one receiving time data more than is necessary to determine the first position is available, and excluding at least one of a faulty receiving time data and a faulty ground transceiver when a fault is detected and at least two receiving time data more than are necessary to determine the first position are available. In another embodiment, the step of determining the second position of the first aircraft and the first position of the second aircraft on the second aircraft further comprises determining an integrity radius and an integrity level of the determined first position of the second aircraft, performing fault detection when at least one receiving time data more than is necessary to determine the first position is available, and excluding at least one of a faulty receiving time data and a faulty ground transceiver when a fault is detected and at least two receiving time data more than necessary to determine the first position are available.

In one embodiment, the step of determining the second position of the second aircraft on the second aircraft further comprises determining an integrity radius and an integrity level of the determined second position of the second aircraft and performing fault detection when at least one receiving time data more than is necessary to determine the second position is available. In another embodiment, the step of determining the first position of the first aircraft on the first aircraft further comprises determining an integrity radius and an integrity level of the determined first position of the first aircraft, performing fault detection when at least one receiving time data more than is necessary to determine the first position is available, and excluding at least one of a faulty receiving time data and a faulty ground transceiver when a fault is detected and at least two receiving time data more than are necessary to determine the first position are available.

In one embodiment, the step of determining the second position of the first aircraft and the first position of the second aircraft on the second aircraft further comprises determining an integrity radius and an integrity level of the determined first position of the second aircraft, performing fault detection when at least one receiving time data more than is necessary to determine the first position is available, and excluding at least one of a faulty receiving time data and a faulty ground transceiver when a fault is detected and at least two receiving time data more than are necessary to determine the first position are available. In another embodiment, the step of determining the second position of the second aircraft on the second aircraft further comprises determining an integrity radius and an integrity level of the second position of the second aircraft, performing fault detection when at least one receiving time data more than is necessary to determine the second position is available, excluding at least one of a faulty receiving time data and a faulty ground transceiver when a fault is detected and at least two receiving time data more than are necessary to determine the second position are available, and excluding a faulty aircraft position data when a fault is detected and at least two aircraft transmitting broadcast messages to which reply message from the plurality of ground-transceivers are transmitted and are received by the second aircraft more than are necessary to determine the second position are available.

In some embodiments, at least one of determining the integrity radius, the integrity level, detecting the fault and excluding one of the faulty receiving time data and the faulty ground transceiver further comprises using range measurements obtained from Distance Measuring Equipment (DME).

In one embodiment, the method further comprises the steps of determining a third position of the first aircraft on the first aircraft using a Global Positioning System (GPS), determining the difference between the determined first position and the determined third position of the first aircraft on the first aircraft, and determining a validity of the determined third position and the determined first position of the first aircraft using the determined difference. In another embodiment, the method further comprises the steps of determining a third position of second aircraft on the second aircraft using a Global Positioning System (GPS), determining a first difference between the determined first position and the determined third position of the second aircraft on the second aircraft, determining a second difference between the determined second position and the determined third position of the second aircraft on the second aircraft, determining a third difference between the determined second position and the determined first position of the second aircraft on the second aircraft, and determining a validity of the first, second, and third positions of the second aircraft using the determined first difference, the determined second difference, and the determined third difference.

In one embodiment, the method further comprises the steps of receiving another broadcast message from the first aircraft on the second aircraft, the another broadcast message comprising at least identify information and another position of the first aircraft, determining a difference between the second position of the first aircraft and the another position of the first aircraft in the another broadcast message, determining a validity of the position of the first aircraft in the another broadcast message using the determined difference.

In another embodiment, the method further comprises the steps of receiving and recording the receiving time of a broadcast message that is not the first broadcast message from an aircraft at a plurality of ground transceivers, determining the propagation time from the aircraft to each of the ground transceivers using at least the data of the position of the aircraft and the position of each of the ground transceivers, determining the difference in the propagation time from the aircraft to each pair of the ground transceivers, determining the difference in the recorded receiving time of the each pair of the ground transceivers, determining the difference between the difference in the propagation time and the difference in the recorded receiving time of the each pair of ground transceivers, selecting a ground transceiver from the plurality of ground transceivers as a reference ground transceiver, correcting the clock of each of the ground transceivers that are not the reference ground transceiver using the determined difference between the difference in the propagation time and the difference in the recorded receiving time, transmitting a time broadcast message at each of the ground transceiver comprising at least the identity information and the transmitting time based on the corrected clock of each of the ground transceivers, receiving and recording the receiving time of the time broadcast message from each of the ground transceivers at an aircraft, and determining position and clock bias of the aircraft that receives the time broadcast messages on the aircraft using at least the recorded the receiving time of each of the time broadcast message and the position of each of the ground transceivers when the position of the aircraft is unknown and determining clock bias of the aircraft that receives the time broadcast messages on the aircraft using at least the recorded the receiving time of each of the time broadcast message, the position of each of the ground transceivers, and the position of the aircraft when the position of the aircraft is unknown. In one embodiment, the method further comprises the steps of synchronizing the clock of the reference ground transceiver to Universal Time Coordinated (UTC), correcting the clock of each of the ground transceivers that are not the reference ground transceiver and the clock of each of the ground transceivers is synchronized to UTC, correcting the clock of each of the aircraft and the clock of each of the aircraft is synchronized to UTC.

According to a second aspect of the present invention, there is provided a method of aircraft navigation using at least one broadcast message, the method comprising the steps of transmitting and recording the transmission time of a first broadcast message at a first aircraft of a plurality of aircraft, the first broadcast message comprising at least identity information of the first aircraft, receiving and recording the receiving time of the first broadcast message from the first aircraft at a plurality of ground transceivers and at a second aircraft, transmitting a reply message to the first broadcast message from each of the plurality of ground transceivers, wherein each reply message comprises at least the ground transceiver's identity and a delay time from receiving the first broadcast message to transmitting the reply message for that ground transceiver, receiving and recording the receiving time of the reply messages transmitted by each of the plurality of ground transceivers at the first aircraft and the second aircraft, and determining a first position of the first aircraft and a first position of the second aircraft on the second aircraft from at least the receiving time data for the first broadcast message, the receiving time data and the delay time for each of the received reply messages, and the positions of each of the plurality of ground transceivers.

According to a third aspect of the present invention, there is provided a method of aircraft navigation using at least one broadcast message, the method comprising the steps of transmitting and recording the transmission time of a first broadcast message at a first aircraft of a plurality of aircraft, the first broadcast message comprising at least identity information of the first aircraft, receiving and recording the receiving time of the first broadcast message from the first aircraft at a plurality of ground transceivers and at a second aircraft, transmitting a reply message to the first broadcast message from each of the plurality of ground transceivers, wherein each reply message comprises at least the ground transceiver's identity and a delay time from receiving the first broadcast message to transmitting the reply message for that ground transceiver, receiving and recording the receiving time of the reply messages transmitted by each of the plurality of ground transceivers at the first aircraft and the second aircraft, determining a first position of the first aircraft on the first aircraft from at least the transmission time data for the first broadcast message, the receiving time data and the delay time for each of the received reply messages and the positions of each of the plurality of ground transceivers, determining a second position of the first aircraft and a first position of the second aircraft on the second aircraft from at least the receiving time data for the first broadcast message, the receiving time data and the delay time for each of the received reply messages, and the positions of each of the plurality of ground transceivers, transmitting a second broadcast message from the first aircraft comprising at least the identity information and the first position of the first aircraft, receiving the second broadcast message at the second aircraft, and determining a second position of the second aircraft on the second aircraft from at least the receiving time data for the first broadcast message, the receiving time data and the delay time for each of the received reply messages, the positions of each of the plurality of ground transceivers, and the first position of the first aircraft contained in the second broadcast message.

BRIEF DESCRIPTION OF THE DRAWINGS

For a fuller understanding of the nature and objects of the invention, reference should be made to the following detailed description of preferred modes of practicing the invention, read in connection with the accompanying drawings in which.

DETAILED DESCRIPTION OF THE INVENTION

The present invention provides a new means of aircraft positioning, navigation, timing, and validation based on diverse-ranging processing that uses aircraft broadcast messages, such as ADS-B messages, and reply messages transmitted by ground transceivers. For example, in one embodiment of the present invention, at least two ground transceivers receive and selectively respond to aircraft broadcast messages emitted by at least a first aircraft (i.e., direct-reply aircraft). The direct-reply aircraft receives and timestamps the reply messages from at a plurality of ground transceivers and calculates own-aircraft position using diverse-ranging processing. A second aircraft (i.e., an eavesdropping aircraft) receives and timestamps the ADS-B messages transmitted by the direct-reply aircraft and corresponding ground reply messages and calculates own-aircraft position, and other-aircraft position (i.e. direct-reply aircraft's position) using diverse-ranging processing. The eavesdropping aircraft can also compute the position of the responding ground transceivers and detect a false ground transceiver position using a validation process in one embodiment of the present invention. In the present invention, the direct-reply aircraft is an aircraft transmitting a broadcast message, such as an ADS-B message, to which a plurality of ground transceivers transmit reply messages, and the eavesdropping aircraft is an aircraft that is transmitting a broadcast message, such as an ADS-B message, to which the ground transceivers do not transmit reply messages.

Figure 1:
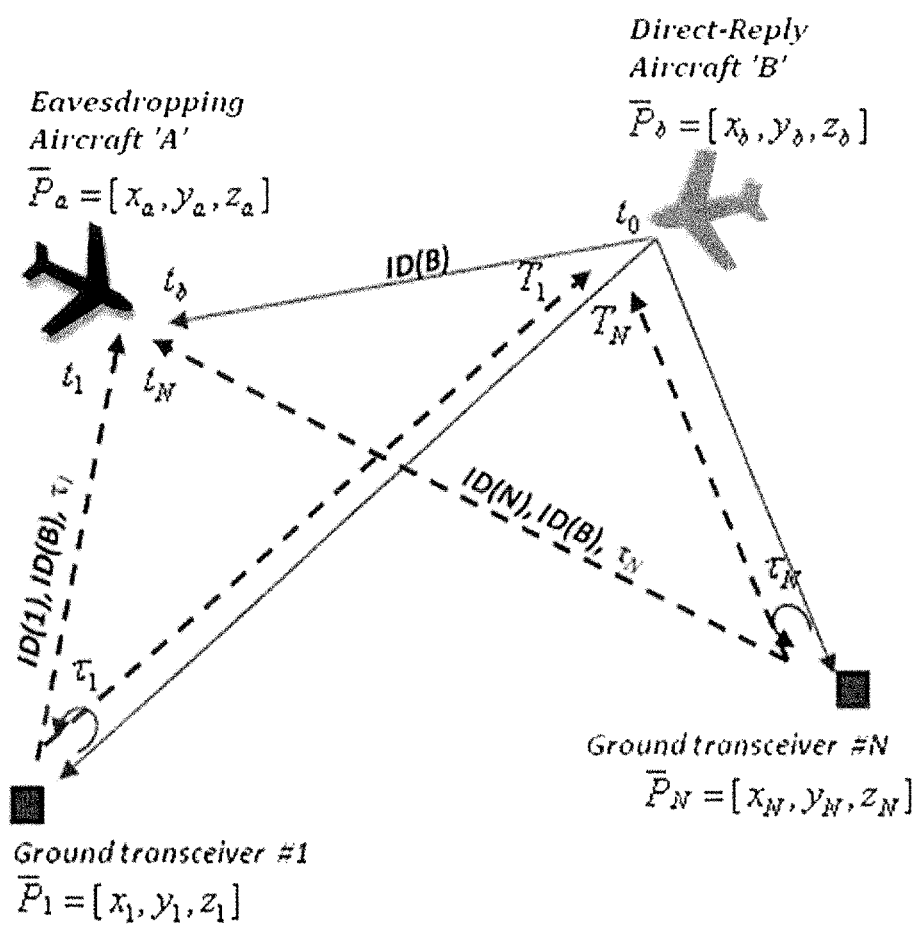
FIG. 1 is a diagram illustrating diverse-ranging of the present invention for aircraft navigation.
Figure 2:
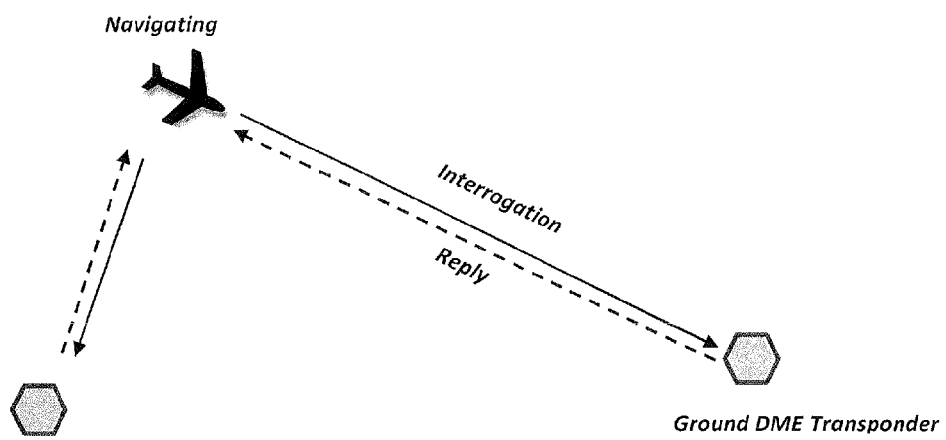
FIG. 2 is a diagram illustrating the prior art of DME/DME means of aircraft navigation.

Referring to FIG. 1, a new means of aircraft navigation based on diverse-ranging using broadcast messages, such as ADS-B messages, and ground transceiver reply messages is based on three system elements: a number of N ground transceivers, where N is a positive integer; at least one aircraft transmitting broadcast messages (i.e., direct-reply aircraft); and at least one other aircraft (i.e., eavesdropping aircraft).

Figure 3:
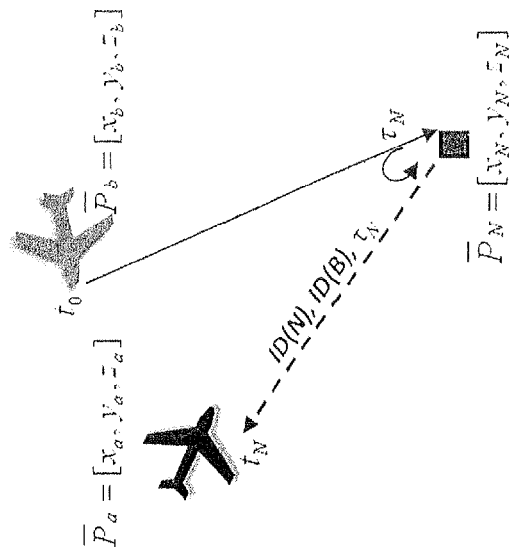
FIG. 3 is a diagram illustrating the diverse-ranging measurements of present invention.
Figure 3:
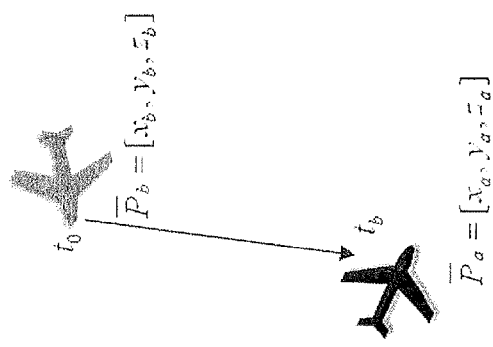
Figure 3:

From the perspective of the direct-reply aircraft, the one type of ranging measurement that is measurable by the direct-reply aircraft is the Round-Trip Range (RTR) measurement between the direct-reply aircraft and a ground transceiver. From the perspective of the eavesdropping aircraft, the two types of ranging measurements that are measurable by the eavesdropping aircraft are a Pseudo Range (PR) measurement between an direct-reply aircraft and the eavesdropping aircraft and an Echoed Pseudo Range (EPR) measurement between an direct-reply aircraft and the eavesdropping aircraft via each ground transceiver. The RTR, PR, and EPR form the diverse-ranging measurements and the generation and use of the diverse-ranging measurements for the purpose of own-aircraft navigation and other-aircraft and ground transceiver position validation is the inventive concept of the present invention. FIG. 3 illustrates the three types of diverse-ranging measurements.

For Round-trip-Range (RTR) position determination by the direct-reply aircraft, each RTR defines a sphere on which the direct-reply aircraft must lie upon, and whose center is the ground transceiver. Range-Range positioning is carried out by the direct-reply aircraft for navigation. Range-Range with EPR-PR positioning is carried out by the direct-reply aircraft for navigation when there are other direct-reply aircraft present and transmitting broadcast messages.

Figure 4:
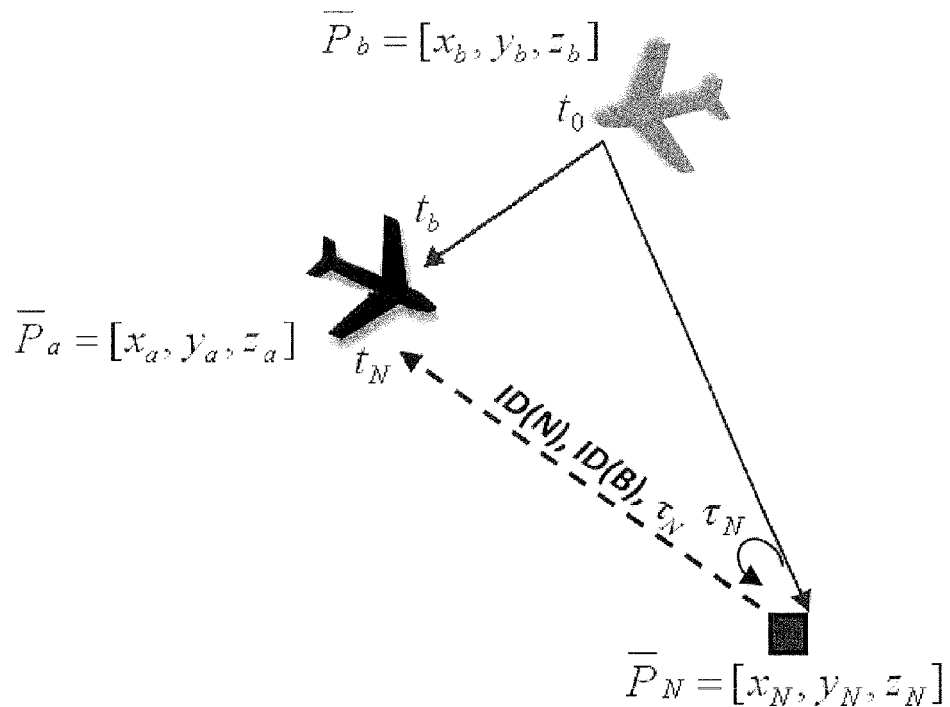
FIG. 4 illustrates the echoed-pseudo range-pseudo range (EPR-PR) equation in one embodiment of the present invention.
Figure 5:
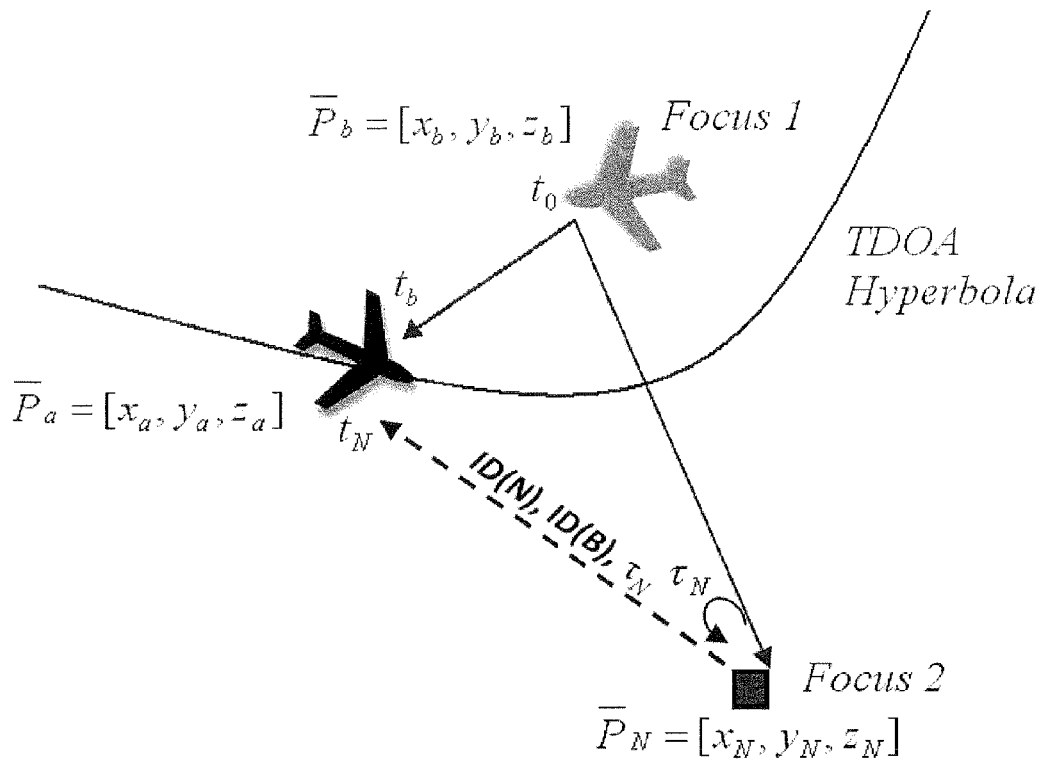
FIG. 5 illustrates the time difference of arrival (TDOA) hyperbolic equation in one embodiment of the present invention.

One example of the Pseudo Range equations and Echoed Pseudo Range equations are shown in FIG. 4. The delta between Echoed Pseudo Range and Pseudo Range is constructed in which the unknown variable to, or the transmission time of the Direct-Reply aircraft's transmitted message, is eliminated and needs not to be solved. Further, as shown in FIG. 5, after rearrangement of the EPR-PR equation, the equation now defines a hyperbolic surface on which the eavesdropping aircraft must lie upon and with the two foci being the ground transceivers and the direct-reply aircraft. TDOA Hyperbolic positioning is used when the position of the direct-reply aircraft is made known to the eavesdropping aircraft. When the position of the direct-reply aircraft also needs to be solved by the eavesdropping aircraft, a 4D surface is formed for solving the positions.

Figure 6:
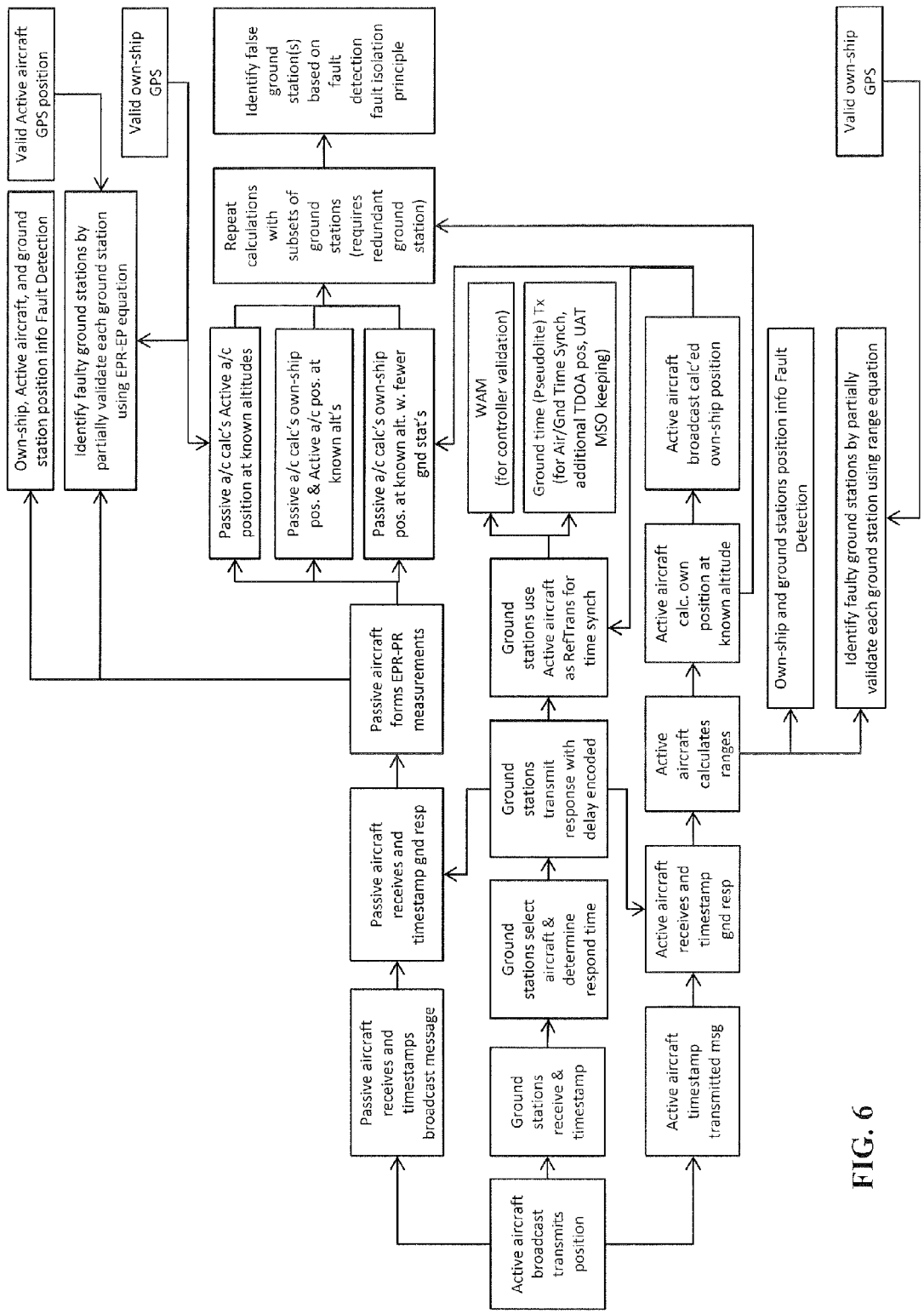
FIG. 6 illustrates a functional flow diagram of one embodiment of the present invention.
Figure 7:
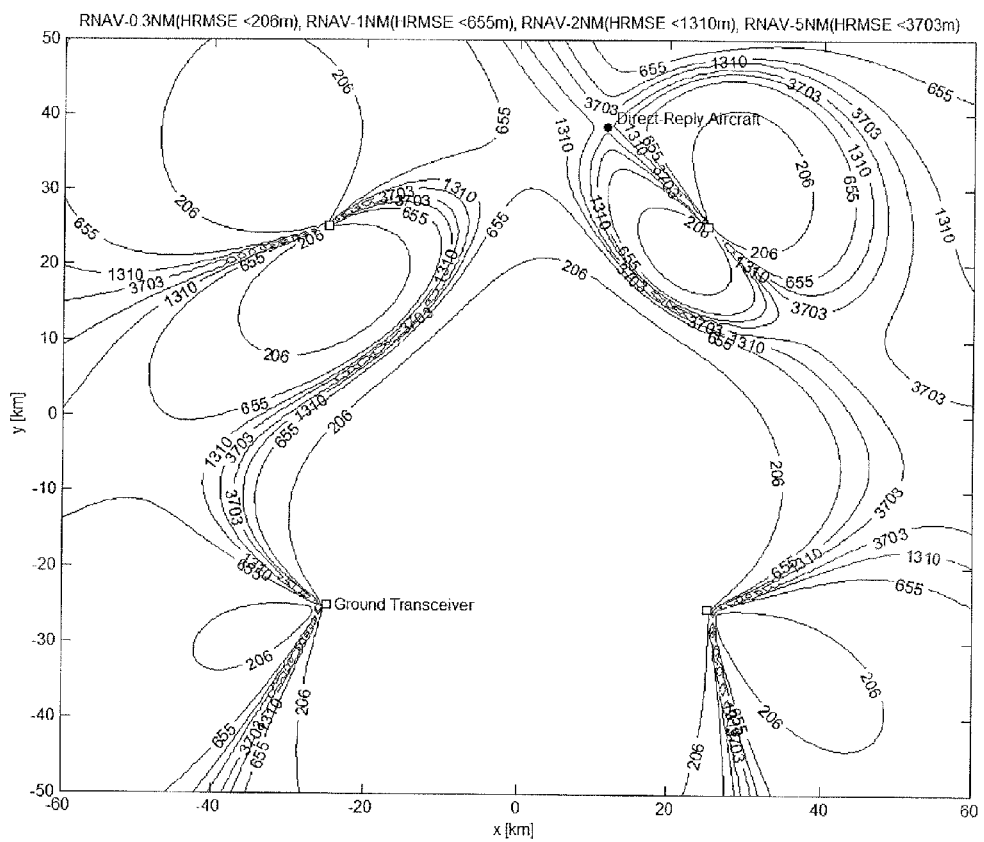
FIG. 7 is a diagram illustrating the equivalent RNAV performance based on expected positioning accuracy of a four-ground transceiver system responding to one ADS-B emitter in a simulation environment.
Figure 8:
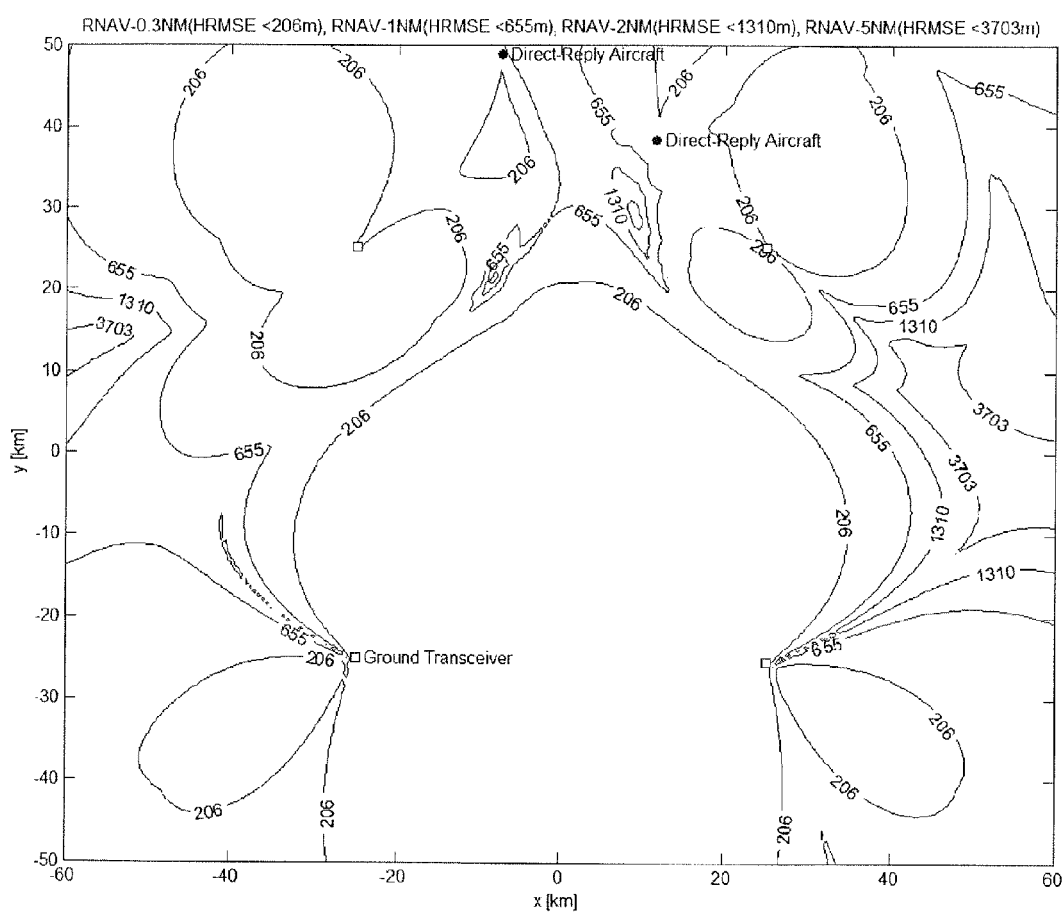
FIG. 8 is a diagram illustrating the equivalent RNAV performance based on expected positioning accuracy of a four-ground transceiver system responding to two Direct-reply aircraft in a simulation environment.
Figure 9:
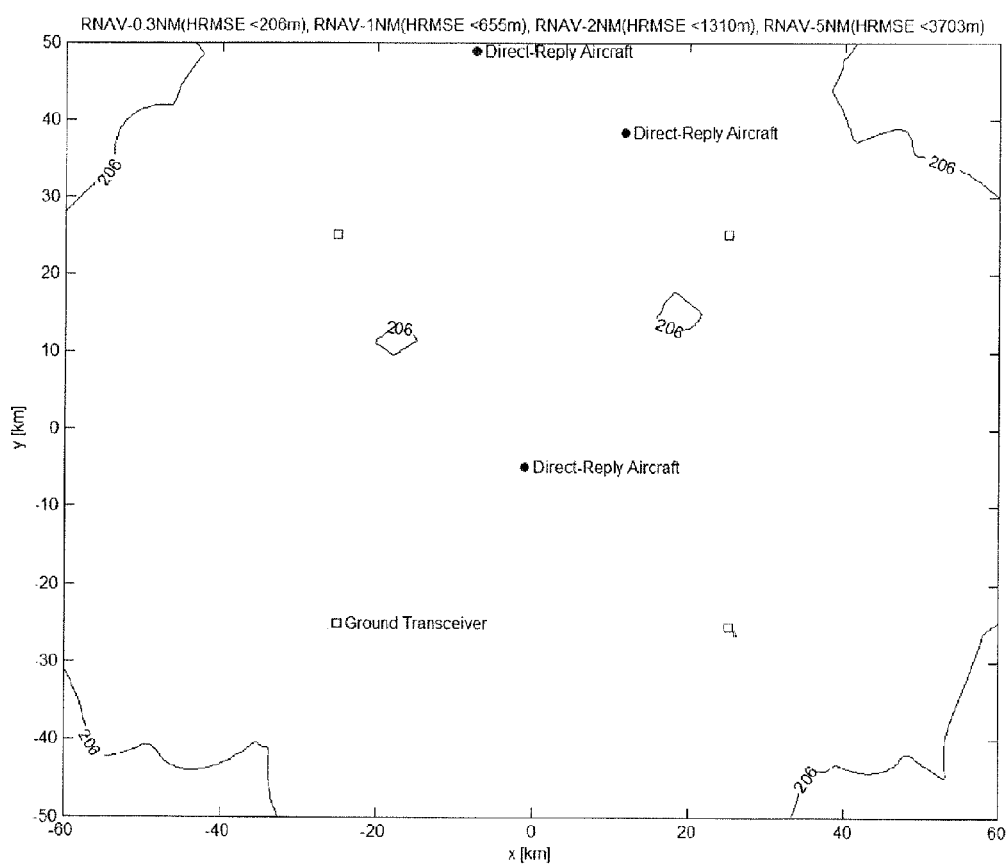
FIG. 9 is a diagram illustrating the equivalent RNAV performance based on expected positioning accuracy of a four-ground transceiver system responding to three Direct-reply aircraft in a simulation environment.
Figure 10:
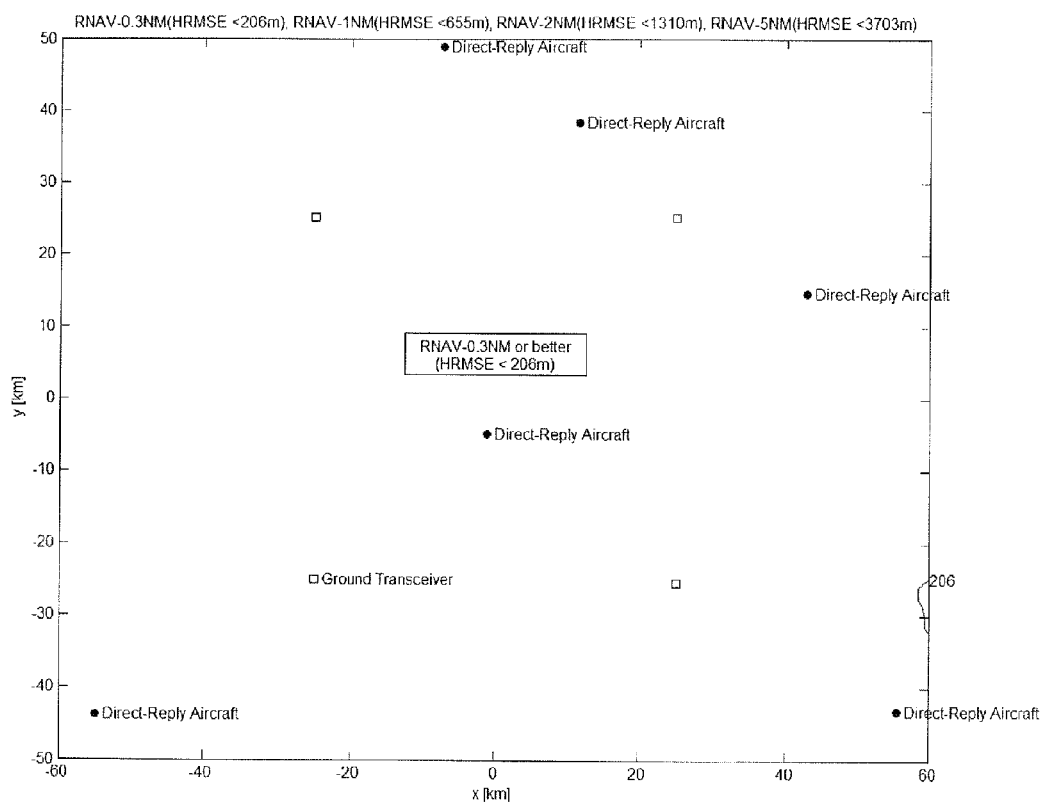
FIG. 10 is a diagram illustrating the equivalent RNAV performance based on expected positioning accuracy of a four-ground transceiver system responding to six Direct-reply aircraft in a simulation environment.

FIG. 6 illustrates a functional flow diagram of one embodiment of the present invention. As shown in FIG. 6, the present invention provides a system and method of aircraft navigation by transmitting a broadcast message from a direct-reply aircraft containing at least identity information in the at least one broadcast message. The broadcast message is received by multiple ground transceivers and other eavesdropping aircraft. Each of the ground transceivers and eavesdropping aircraft time stamp (i.e., record the time of receipt based on local clock of message) the received broadcast message. A subset of the ground transceivers receiving the broadcast message transmits a reply message in response to the broadcast message. Each of the reply messages includes at least the identity of the ground transceiver and a delay time for that ground transceiver from receiving the broadcast message to transmitting the reply message.

The direct-reply aircraft and the eavesdropping aircraft each receive and time stamp the reply messages transmitted by the subset of the ground transceivers. Since the position of the ground transceivers is known to both the direct-reply aircraft and eavesdropping aircraft, the eavesdropping aircraft can use the diverse-ranging processing of the present invention to determine its own position independent of GPS from at least the time-stamp data for the broadcast message and reply messages, the delay time for each of the ground transceivers contained in the received reply messages, the known positions of each of the ground transceivers, altitude data available on the eavesdropping aircraft from other installed sensors, and the altitude data for the direct-reply aircraft if included in the direct-reply aircraft's broadcast message. The eavesdropping aircraft can also determine the position of the direct-reply aircraft independent of GPS using the diverse-ranging processing of the present invention from the aforementioned data. As shown in FIG. 6, the diverse-ranging processing on the eavesdropping aircraft can include determining a pseudo range measurement to the direct-reply aircraft, determining echoed pseudo range measurements to the direct-reply aircraft via each of the ground transceivers transmitting a reply message, and determining its own position using at least the pseudo range measurement, the echoed pseudo range measurements and altitude data. The eavesdropping aircraft can also determine the position of the direct-reply aircraft using the pseudo range measurement and the echoed pseudo range measurements. The pseudo range measurement and echoed pseudo range measurements are discussed in detail later in the specification. Further, when GPS is available, the present invention enables the eavesdropping aircraft to validate their GPS based position and the GPS based position of the direct-reply aircraft that was included in the broadcast message.

In addition, the diverse-ranging processing of the present invention also enables the direct-reply aircraft to determine its own position independent of GPS from the time-stamp data for the broadcast message and received reply messages, the delay time for each of the ground transceivers contained in the received reply messages, the known position of each of the ground transceivers and altitude data. The direct-reply aircraft determines its position by determining a round-trip range to the ground transceivers transmitting reply messages and altitude data available on the direct-reply aircraft from other installed sensors. Further, when GPS is available, the present invention enables the direct-reply aircraft to validate their GPS based position.

As shown in FIG. 6, the present invention also provides a method of verifying the validity of the position of one or more of the ground transceivers that were transmitting the reply messages at the direct-reply aircraft or the eavesdropping aircraft when more than the minimum number of ground transceivers have transmitted reply messages using the diverse-ranging processing equations that are discussed in detail later in the specification. The transmitted position of the ground transceiver is identified as faulty when the position determined for own aircraft using diverse-ranging processing from the time-stamp data for the broadcast message and received reply messages, the positions of each of the ground transceivers and the delay time for received reply messages from the other ground transceivers is an outlier from the position determined using the time-stamp data for the broadcast message, the positions of each of the ground transceivers, and the time-stamp data and the delay time for the received reply messages from other combinations of ground transceivers that include the ground transceiver identified as faulty.

As shown in FIG. 6, the present invention provides a method of synchronizing time data at each of the ground transceivers receiving the broadcast message when GPS is not available, by using the transmitted broadcast message as a reference transponder signal to synchronize time data at each of the ground transceivers receiving the transmitted broadcast message. This enables the present invention to broadcast time data from the time data synchronized subset of ground transceivers to other aircraft for pseudolite navigation by the other aircraft, and to enable synchronization of Universal Access Transceiver (UAT) equipped aircraft and ground stations for sustaining the Message Start Opportunity (MSO)-protocol based ground-and-air communications.

The present invention also enables the eavesdropping aircraft to verify the position of the direct-reply aircraft transmitted in the broadcast message by comparing the transmitted position of the direct-reply aircraft in the broadcast message to the determined position of the first aircraft and validating the position of the first aircraft when the transmitted position and the determined position of the first aircraft are within a predetermined tolerance.

ADS-B System Embodiment

In one embodiment, the present invention seeks innovative use of existing and planned components of the NextGen ground and air segments for the goal of achieving significant cost benefits to government and civilians. In particular, the aforementioned aircraft GPS position broadcasting system, known as Automatic Dependent Surveillance-Broadcast (ADS-B) system is to be leveraged and modified in a way that allows aircraft to determine their own positions when GPS is unavailable.

In the existing ADS-B system, an aircraft broadcasts its GPS position via ADS-B messages transmitted by onboard ADS-B avionics enabling near-by aircraft and a network of ground transceivers to receive the position information of the aircraft for situational awareness, collision avoidance, and air traffic management. The present invention provides that, in addition to plainly receiving ADS-B messages from the aircraft, the ground transceivers select a small group of aircraft and transmit reply messages to these aircraft after receiving their ADS-B messages. These reply messages are transmitted in a controlled fashion such that the time delay between receiving the ADS-B message and transmitting the response is not only random but is precisely known and included in the response message.

One ingenious part of the present invention is that any aircraft, including the ADS-B emitting or transmitting aircraft (i.e., the direct-reply aircraft) and the ADS-B receiving aircraft (i.e., the eavesdropping aircraft), upon receiving the ADS-B messages and associated ground transceiver reply messages, will be able to compute not only their own position, but also the positions of each aircraft that transmits the ADS-B messages to which ground transceivers transmitted reply messages. Such revolutionary improvement from the existing ADS-B concept not only allows the ADS-B system to provide a viable navigation source during GPS outages, but also provides inherent protection against the transmission of maliciously misleading ADS-B information by enabling aircraft and ground stations to calculate another aircraft's position independent of the reported position in the ADS-B message. In addition, when there are more than a minimum required number of ground transceivers involved, by applying fault detection and isolation procedures, faulty or false ground position information can be detected and identified.

Another ingenious part of the present invention is its selection of only a small number of aircraft for the ground transceivers to transmit reply messages. This arrangement guarantees that the ground transceiver response transmissions do not contribute to spectrum congestion and the small number of reply messages have been shown in a generic analysis to be sufficient to provide the accuracy needed to sustain the NextGen high-efficiency flight procedures down to at least the so-called RNP-0.3NM level, which is needed for NextGen operations and is achievable only via GPS in both today's environment and the NextGen environment. Since the present invention is based on simply modifying the existing and planned infrastructure and avionics, the cost impact is minimized. Also, while the ADS-B system can be spoofed, the high-power nature of ADS-B signals make ADS-B signals difficult to jam using small devices making it inherently safer than GPS. In addition, the ground transceivers that simply respond to a few direct-reply aircraft require no synchronization among them, such that the system is fully independent of GPS, eLORAN or any other types of time synchronization infrastructure, is self-sufficient and requires a lower implementation cost due to its low complexity. Lastly, the synergetic use of resources reduces the amount of material and energy consumed and provides a sustainable outlook to the system.

The embodiment of the present invention using ADS-B messages will be described in detail in the following sections. However, the present invention is not limited to this disclosed embodiment using ADS-B. For example, military MODE-5 Level 2 and MODE-5 Level 2B systems, which are similar to ADS-B in nature, are compatible with the present invention. Similarly, military communications system such as Link 16, when transmitter identity information is encoded in the signal the present invention applies as well. In fact, any wireless communication system with messages containing transmitter identity information will be compatible with the present invention. The present invention is applicable to all such wireless communication systems.

Figure 15:
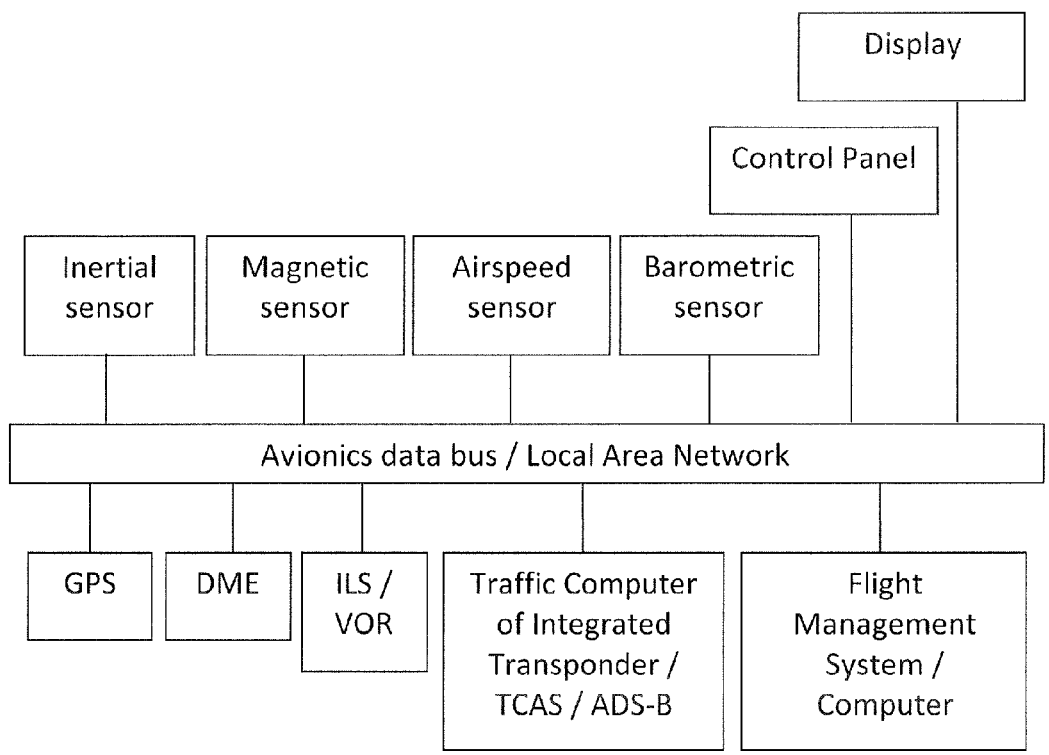
FIG. 15 is an example of a hardware and software functional block diagram of an aircraft equipped with integrated TCAS and Mode-S ADS-B in one embodiment of the present invention.

An example of hardware and software functional block diagram for aircraft equipped with modem integrated Traffic Collision Avoidance System (TCAS) and MODE-S transponder based ADS-B IN/OUT system are depicted in FIG. 15. In FIG. 15 the traffic computer module of the integrated TCAS/transponder/ADS-B system is connected to an avionics data bus, which also connects the flight management system (FMS) and other navigation sources such as DME, GPS, ILS and VOR and other sensors such as inertial, airspeed, magnetic heading, and barometric altitude sensors. The traffic computer and FMS are basically computer hardware that can be installed with the Diverse Ranging APNT software module, which processes the message and timestamp data of the required ADS-B messages and ground replies of present invention and other navigation source data and sensory data available at the time of computation. The computed positional and navigational data are then used by the ADS-B module and navigation (RNAV/RNP) module.

ADS-B System Components

Referring to FIG. 1, the new means of aircraft navigation based on diverse-ranging using ADS-B messages, and ground transceiver reply messages is based on three system elements: a number of N ground transceivers, where N is a positive integer; at least one ADS-B equipped aircraft transmitting ADS-B broadcast messages (i.e., direct-reply aircraft); and at least one other aircraft receiving the ADS-B broadcast messages from the direct-reply aircraft and reply messages transmitted by the ground transceivers (i.e., eavesdropping aircraft). The individual roles and responsibility of each of the system elements is explained in the following paragraphs.

Ground Transceivers:

The ground transceivers receive the ADS-B messages transmitted by the direct-reply aircraft and selectively transmit reply messages to a small subset of ADS-B messages after a random delay that is included in the reply messages. The reply messages also include the identity information of the ground transceiver and the identity of the ADS-B emitter. The ground transceivers also broadcast ADS-B like messages containing the identity information and the precise location of the ground transceiver. In addition, at least one of the ground transceivers also broadcasts local means-sea-level (MSL) pressure and temperature data for the aircraft to correct the barometric altimeter bias in the altitude data. In one embodiment of the present invention, when a direct-reply aircraft receives a reply message from at least one ground transceiver to its ADS-B broadcast message, the direct-reply aircraft will indicate such status via a selection status in later ADS-B messages for a fixed period of time. Other ground transceivers will recognize the status of the direct-reply aircraft via the selection status indicator in the ADS-B message and will reply to subsequent ADS-B messages during the fixed period of time. ADS-B messages transmitted by direct-reply aircraft that contain no selection status indicator will not be responded to unless they are subsequently selected by a ground transceiver. Each ground transceiver receives a quota of a maximum number of direct-reply ADS-B aircraft that it can independently select. In another embodiment of the present invention, the ground transceivers are connected via a low-bandwidth network to a regional or central server, which selects ADS-B targets for the ground transceivers in a more intelligent manner by detecting and proactively predicting aircraft in need of positioning information and responding to such aircraft needs by selecting aircraft to facilitate more advantageous range-based positioning. When only a few direct-reply aircraft are available in the airspace, the ground transceivers will respond to each of the available direct-reply aircraft. The ground transceivers of the present invention are ground transceivers that receive transmitted messages from aircraft and transmit messages to aircraft, such as ADS-B, DME, Mode S, TIS-B, FIS-B, VDL-2 and VDL-4, that have software and hardware modification necessary to transmit reply messages to a selected subset of aircraft transmitting broadcast messages.

Direct-Reply Aircraft:

The direct-reply aircraft transmits ADS-B messages, receives reply messages from ground transceivers, calculates a Round-Trip Range (RTR) measurement between the direct-reply aircraft and each ground transceiver, and then estimates its own position using the RTR measurements, the known positions of the ground transceivers, and own-aircraft altitude data derived from an onboard sensor and the MSL pressure and temperature data transmitted by a ground transceiver. In addition, the own position solution can be refined by using other direct-reply aircraft's ADS-B messages and corresponding reply messages from ground transceivers using diverse-ranging processing. For example, given own-aircraft altitude, reply messages from two ground transceivers are required for calculating the horizontal position of own-aircraft. The calculated position is used by navigation processors integrated with other navigation sources for tracking the position of own-aircraft. In this embodiment, either the calculated position or a tracked position is supplied to the ADS-B system for transmission in the ADS-B broadcast message. In one embodiment of the present invention, if the calculated position is broadcast, it will be so indicated in the ADS-B message. When the direct-reply aircraft has other independent navigation sources that are working, such as a working GPS or DME/DME/IRU, the range measurements can be used for validating the position of a ground transceiver. The position of the direct-reply aircraft can be either valid or corrupted. The direct-reply aircraft includes modifications to avionics hardware and software necessary to receive and process the reply messages transmitted by a subset to ground transceivers and the diverse-ranging processing to process the received reply messages, position data and time-stamp data. The diverse-ranging processing can be performed on an existing avionics computer, such as a flight management computer (FMC), ADS-B processor or other avionics computer.

Eavesdropping Aircraft:

The eavesdropping aircraft estimates own-aircraft position and other-aircraft (i.e., direct-reply aircraft) positions by passively receiving and time-stamping (i.e., record the time of receipt based on the local clock of message) the ADS-B messages and reply messages transmitted by the ground transceivers using diverse-ranging processing, the known positions of the ground transceivers, and the altitude data derived from the onboard sensor and received ADS-B message from direct-reply aircraft and the MSL pressure and temperature data transmitted by ground transceiver. For example, given own-aircraft altitude and the altitude of a direct-reply aircraft, reply messages from two or more ground transceiver are required for calculating own-aircraft horizontal position. When the position of the direct-reply aircraft and own-aircraft position are solved simultaneously, two or more direct-reply aircraft and three or more ground transceivers are required or one direct-reply aircraft and four or more ground transceivers are required. The position solutions are refined using other available direct-reply aircraft messages and corresponding reply messages transmitted by ground transceivers. The Mode-C altitude information of the direct-reply aircraft is contained in standard ADS-B messages, as well as many other MODE-S message types. Ground transceiver positions can be validated when more than a minimum required number of ground transceivers are available using fault detection and isolation procedures. The ground validation can be carried out simultaneously with the calculation of own-aircraft and other-aircraft positions. The eavesdropping aircraft includes modifications to avionics hardware and software necessary to receive and process the received broadcast message, received reply messages transmitted by a subset to ground transceivers and the diverse-ranging processing to process the received broadcast message and reply messages, position data and time-stamp data. The diverse-ranging processing can be performed on an existing avionics computer, such as an FMC, ADS-B processor or other avionics computer.

ADS-B System Diverse-Ranging Processing

There are numerous ways a participating aircraft can make use of the diverse-ranging measurements. First of all, being a direct-reply aircraft does not preclude the direct-reply aircraft from also receiving ADS-B messages and reply messages from ground transceivers with respect to other ADS-B emitting (i.e., direct-reply) aircraft. As such, an aircraft can obtain all three types RTR, PR, and EPR measurements and the number of each type of measurements will be dependent upon the number of direct-reply aircraft and responding ground transceivers available at the time of the measurement. At any given moment, the available diverse-ranging measurements can be used for solving own position and other problems corresponding to different applications, tasks, or purposes. For example, the diverse-ranging measurements can be used (i) for solving own-aircraft position, (ii) for solving other-aircraft position, (iii) for solving ground transceiver position and (iv) for isolating or at least detecting faulty position information of a ground transceiver. These tasks can be solved separately or can be solved jointly in a simultaneous fashion. In short, the diverse-ranging measurements are useful for not only providing own-aircraft positioning purpose, but also providing position validation of other-aircraft reported positions and ground transceiver reported locations.

From either the eavesdropping aircraft or direct-reply aircraft perspective, the diverse-ranging measurements including the RTR, PR, and EPR measurements, provide versatile functionalities for helping the aircraft to not only determine own-aircraft position for the purpose of navigation, but also to determine the position information of other aircraft, as well as validating the positions of ground transceivers. Some of these versatile functionalities are summarized in the following non-exhaustive list.

Function 1: Emitting aircraft position validation (air validation).

Function 2: Emitting ground transceiver position validation (ground validation).

Function 3: Own-aircraft positioning (navigation) in GPS jamming.

Function 4: Simultaneous navigation and air validation in GPS jamming.

Function 5: Simultaneous navigation and ground validation in GPS jamming.

Function 6: Simultaneous navigation, ground validation and air validation in GPS jamming.

Based on the notations included in FIG. 1, $(x_a, y_a, z_a)$ is the position of the eavesdropping aircraft, $(x_b, y_b, z_b)$ is the position of the direct-reply aircraft, $(x_i, y_i, z_i)$ is the position of the i-th ground transceiver, where i=1 ... N, $t_0$ is the transmission time of the ADS-B message from the direct-reply aircraft, $t_b$ is the receiving time of the ADS-B message at the eavesdropping aircraft, $t_1 \ldots t_N$ are the receiving time at the eavesdropping aircraft of the reply messages transmitted by the 1st to N-th ground transceivers respectively. $T_1 \ldots T_N$ are the receiving time at the direct-reply aircraft of the reply messages transmitted by the 1 st to N-th ground transceivers respectively, and $\tau_1 \ldots \tau_N$ are the receiving the ADS-B message to transmitting a reply message delay (e.g., receiving-to-responding delay) of the 1st to N-th ground transceivers respectively, the various functionalities can be understood from either the direct-reply aircraft or the eavesdropping aircraft perspective as follows.

From the direct-reply aircraft perspective, the transmission time of the ADS-B message and receiving time of reply messages from the ground transceivers are known. Since the ground transceiver delay is made known to the direct-reply aircraft in the reply message transmitted by each of the ground transceivers, the round-trip range can be calculated. The direct-reply aircraft also measures its altitude using a barometric altimeter (with bias corrected using MSL pressure and temperature data) or a radar altimeter, so the vertical position is also known. The positions of the ground transceivers are also known because the position is either included in the reply message, stored in an onboard database, or are broadcast in separate ADS-B like messages. The transmitted ground transceiver positions are used along with RTR measurement, delay time information, and altitude for calculating the horizontal position of the direct-reply aircraft to supplement GPS receiver position (Function 3). The calculated position (i) can be used for navigation backup of GPS-based navigation, (ii) can be fused with GPS position and (iii) can be used to provide enhanced integrity in the receiver autonomous integrity monitoring (RAIM) processing. When GPS position is available, the transmitted positions of the ground transceivers can be validated using the RTR and the known own-aircraft position (Function 2). In this case an erroneous ground transceiver position (and/or delay information) results in a distance to the direct-reply aircraft that is different from the measured RTR. When the calculated position is used for backing-up GPS-based navigation and the position is reported in ADS-B, such ADS-B position information can be used by other eavesdropping aircraft for navigation purposes, as will be explained next.

From the eavesdropping aircraft perspective, the transmission time of the ADS-B message is unknown and the receiving time of corresponding reply messages transmitted by the ground transceivers are known based on its local clock. The ground transceiver delays are transmitted in the reply messages and are known to the eavesdropping aircraft. The positions of the ground transceivers are also known because the position is either included in the reply message, stored in an onboard database, or are broadcast in separate ADS-B like messages. The altitude information of each direct-reply aircraft is known because the altitude information is broadcast by the direct-reply aircraft in ADS-B messages and other MODE-S messages. The altitude of own-aircraft is known via the onboard radar altimeter or barometric altimeter with bias corrected using MSL pressure and temperature data transmitted by a ground transceiver. The horizontal position of the direct-reply aircraft is known to the eavesdropping aircraft when GPS is available via the ADS-B message, and when the GPS is not available via the calculated position based on RTR positioning or any other means that is reported in the ADS-B message. The eavesdropping aircraft then can calculate its own-aircraft position using all of the available PR and EPR measurements and the known (reported) positions of direct-reply aircraft and ground transceivers (Function 3) or calculate both own-aircraft position and the position of the direct-reply aircraft using available PR and EPR measurements and the known position of ground transceivers (Function 4). The eavesdropping aircraft can even simultaneously calculate own-aircraft position and direct-reply aircraft position as well as detecting and isolating faulty ground transceiver position information using all of the available measurements (Functions 5 & 6). When valid GPS position information is available to the eavesdropping aircraft, the eavesdropping aircraft can use the PR and EPR measurement to validate the reported position of the direct-reply aircraft (Function 1) as well as detecting and isolating faulty ground transceiver position (Function 2).

Based on the notations of FIG. 1, Function 3 (own-aircraft positioning in GPS jamming) for an direct-reply aircraft is the problem of solving own-aircraft horizontal position $(x_b, y_b)$ given $t_0, z_b, T_1 \ldots T_N, \tau_1 \ldots \tau_N$, and $(x_1, y_1, z_1) \ldots (x_N, y_N, z_N)$. This calculation is done by the direct-reply aircraft avionics. The estimate of the unknown horizontal position are the values of $(x_b, y_b)$ that best fit the following RTR equations:

$$C(T_1 - \tau_1 - t_0)/2 = \sqrt{(x_1 - x_b)^2 + (y_1 - y_b)^2 + (z_1 - z_b)^2}$$
$$\vdots$$
$$C(T_N - \tau_N - t_0)/2 = \sqrt{(x_N - x_b)^2 + (y_N - y_b)^2 + (z_N - z_b)^2}$$

(N≥2)

Note that the ground transceivers can respond at different rates. Whenever desired, a lowering of the ground transceiver uplink transmission rate can be done by coasting the aircraft position using an on-board inertial reference unit (IRU). The coasting of the aircraft position is done over a short time interval on the order of a minute, resulting in a lower reply transmission rate.

The Function 3 (own-aircraft positioning in GPS jamming) for a eavesdropping aircraft is the problem of solving own-aircraft horizontal position $(x_a, y_a)$ and ADS-B transmitting time $t_0$, given $(x_b, y_b, z_b), t_b, z_a, t_1 \ldots t_N, \ldots \tau_1 \ldots \tau_N$, and $(x_1, y_1, z_1) \ldots (x_N, y_N, z_N)$. This calculation is done on the eavesdropping aircraft avionics. The estimate of the unknown horizontal position and transmission time of ADS-B message are the values of $(x_a, y_a, t_0)$ that best fit the following PR and EPR equations:

$$C(t_b - t_0) = \sqrt{(x_a - x_b)^2 + (y_a - y_b)^2 + (z_a - z_b)^2}$$
$$C(t_1 - \tau_1 - t_0) = \sqrt{(x_a - x_1)^2 + (y_a - y_1)^2 + (z_a - z_1)^2} + \sqrt{(x_1 - x_b)^2 + (y_1 - y_b)^2 + (z_1 - z_b)^2}$$
$$\vdots$$
$$C(t_N - \tau_N - t_0) = \sqrt{(x_a - x_N)^2 + (y_a - y_N)^2 + (z_a - z_N)^2} + \sqrt{(x_N - x_b)^2 + (y_N - y_b)^2 + (z_N - z_b)^2}$$

(N≥2)

Additionally, ground transceiver validation (Function 5) can be carried out when at least one additional ground transceiver is available (i.e. N≥3). In this case, the calculation can be repeated for groups of equations with each group containing two EPR equations from two ground transceivers. If all transceivers positions are valid, the solutions should be consistent. If the position of one of the ground transceivers is erroneous, the solution becomes an outlier and can be isolated. Note that the detection of the existence of an erroneous ground transceiver position can be done with the case of N=2.

Based on the notations of FIG. 1, the Function 4 (Simultaneous self positioning and air validation in GPS jamming) for a eavesdropping aircraft is the problem of solving unknown horizontal positions $(x_a, y_a)$ and $(x_{bk}, y_{bk})$ and unknown transmitting time of the ADS-B message, $t_{0j}$, given $z_{aj}$, $z_{bj}$, $t_{bj}$, $t_{1k} \ldots t_{Nk}$, $\tau_{1k} \ldots \tau_{Nk}$, and $(x_1, y_1, z_1) \ldots (x_N, y_N, z_N)$ for k=1 ... K. This calculation is done on the eavesdropping aircraft avionics. The estimate of the unknown horizontal positions and transmission time of ADS-B message are the values of $(x_a, y_a, x_{bk}, y_{bk}, t_0)$, for k=1 ... K that best fit the following PR and EPR equations:

$$C(t_{bk} - t_{0k}) = \sqrt{(x_a - x_{bk})^2 + (y_a - y_{bk})^2 + (z_a - z_{bk})^2}$$

$$C(t_{1k} - \tau_{1k} - t_{0k}) = \sqrt{(x_a - x_1)^2 + (y_a - y_1)^2 + (z_a - z_1)^2} +$$
$$\sqrt{(x_1 - x_{bk})^2 + (y_1 - y_{bk})^2 + (z_1 - z_{bk})^2}$$

$$\vdots$$

$$C(t_{Nk} - \tau_{Nk} - t_{0k}) = \sqrt{(x_a - x_N)^2 + (y_a - y_N)^2 + (z_a - z_N)^2} +$$
$$\sqrt{(x_N - x_{bk})^2 + (y_N - y_{bk})^2 + (z_N - z_{bk})^2}$$

(N≥4 given only one direct-reply aircraft, i.e. for k=1)
(N≥3 given two or more direct-reply aircraft i.e. for k=1, 2, ... K)

A more robust solution is found iteratively using Maximum-Likelihood Estimator by assuming Gaussian measurement errors. Additionally, ground transceiver validation (Function 6) can be carried out when at least one additional ground transceiver is available (i.e. N≥4 for K≥2 or N≥5 for K=1). In this case, the calculation can be repeated for groups of equations with each group containing all but one EPR equation from all but one of the ground transceivers. If all ground transceivers positions are valid, the solutions should be consistent. If the position of one of the ground transceivers is erroneous, the solution becomes an outlier and can be isolated. Note that the detection of the existence of an erroneous ground transceiver position can be done with the case of N=3 for K≥2 or N=4 for K=1.

A final $(x_a, y_a)$ solution is fused from distinct solutions derived from all available ADS-B target messages (i.e., for j=1 ... K) and reply messages from ground transceivers using standard Kalman Filtering approaches. It is by this fusion the position accuracy is improved as more direct-reply aircraft are available and are being selected by ground transceivers for transmitting response messages. Referring to FIGS. 7-10, where positioning accuracy performance of the diverse-ranging algorithm is simulated based on a system of four ground transceivers transmitting reply messages to 1, 2, 3, and 6 direct-reply aircraft, respectively, as more and more direct-reply aircraft are selected for transmitting reply messages the RNP-0.3NM coverage improves.

Note that for the case of two or more direct-reply aircraft that are in view of the eavesdropping aircraft (i.e., K≥2) and reply messages are transmitted by three or more ground transceivers to their ADS-B messages, the positions of the eavesdropping aircraft and all of the direct-reply aircraft can be resolved by the eavesdropping aircraft upon receiving and time stamping the ADS-B messages and corresponding reply messages transmitted by the three or more ground transceivers when the eavesdropping aircraft position at the times of receiving these ADS-B messages can be considered as the same location. The following paragraph explains how this embodiment works.

Assume that more than one ADS-B message arrives at the eavesdropping aircraft very close in time or assume that the eavesdropping aircraft is moving at a very slow speed such that the position of the eavesdropping aircraft can be considered as the same location when the more than one ADS-B messages are received. Considering that the eavesdropping aircraft introduces 2 unknowns $(x_a, y_a)$ to the estimation problem, and each of the ADS-B emitter introduces 3 unknowns $(x_{bk}, y_{bk}, t_{0k})$ where k indicates the k-th emitter. Now if there are K direct-reply aircraft (i.e., k=1, 2, ... K) and N ground transceivers, in order for the 2+3K unknowns to be solvable, there must be at least 2+3K independent equations available. Since each ground transceiver provides one equation for each ADS-B emitter (via the measurement of the receiving time of a response) and each ADS-B emitter provides one equation on its own position (via the measurement of the receiving time of the ADS-B message), there are K(N+1) measurement equations available. For the positions to be solvable, (1+N)K≥2+3K must be true, or equivalently this condition N≥2/K+2 must be met. Because K and N are positive integers, N≥3 must be true so the condition can be met. In the case of N=3, K≥2 must be true such that the condition can be met. So in summary, this embodiment teaches that when there are two or more direct-reply aircraft that are each responded to by three or more ground transceivers where the two sets of the three or more ground transceivers need not to be identical, an eavesdropping aircraft that receives these ADS-B messages and the corresponding ground transceiver reply messages can determine its own position and the positions of the direct-reply aircraft when the position of the eavesdropping aircraft at the times of receiving the ADS-B messages can be considered as the same location.

Other Embodiments

In another embodiment of present invention discloses the use of velocity data derived from an inertial reference unit (IRU), inertial measurement unit (IMU) or attitude heading reference system (AHRS) to aid the positioning process. When velocity data is used, the nonlinear equations formed from the received ADS-B messages from multiple direct-reply aircraft and reply messages transmitted by ground transceivers can be combined for solving the positions of the eavesdropping aircraft and the direct-reply aircraft such that multiple time instances can be combined to produce a solution. In this case reply messages from only three, instead of four, ground transceivers are required for each ADS-B emitter because the velocity data can be used for the determination of position deviation of an aircraft in time from a reference point in time and space. The position of an aircraft sometime after a reference point in space and time can be formulated as reference point in space (reference position) plus the position deviation from the reference point in space since the reference point in time (reference time). A set of nonlinear equation based on K ADS-B emitter messages can be obtained and written as the following:

$$C(t_{bk} - t_{0k}) = \sqrt{(x_{ak} - x_{bk})^2 + (y_{ak} - y_{bk})^2 + (z_{ak} - z_{bk})^2}$$

$$C(t_{1k} - \tau_{1k} - t_{0k}) = \sqrt{(x_{ak} - x_1)^2 + (y_{ak} - y_1)^2 + (z_{ak} - z_1)^2} +$$
$$\sqrt{(x_1 - x_{bk})^2 + (y_1 - y_{bk})^2 + (z_1 - z_{bk})^2}$$

$$\vdots$$

$$C(t_{Nk} - \tau_{Nk} - t_{0k}) = \sqrt{(x_{ak} - x_N)^2 + (y_{ak} - y_N)^2 + (z_{ak} - z_N)^2} +$$
$$\sqrt{(x_N - x_{bk})^2 + (y_N - y_{bk})^2 + (z_N - z_{bk})^2}$$

where k=1, 2, . . . , K, and K≥2;
N≥3; and
$x_{ak} = x_{aR} + dx_{Rk}$; $y_{ak} = y_{aR} + dy_{Rk}$; $z_{ak} = z_{aR} + dz_{Rk}$
where $(dx_{Rk}, dy_{Rk}, dz_{Rk})$ is the position deviation from a reference position $(x_{aR}, y_{aR}, z_{aR})$ since a reference time with respect to the k-th ADS-B message.

The number of unknowns introduced by the K direct-reply aircraft is 2+3K and the number of equations from average of N ground transceiver reply messages for each ADS-B message is (1+N)K such that in order for the positions to be solvable, (1+N)K≥2+3K must be true or equivalently, or N≥2/K+, since K≥1, N≥2. In this embodiment, when there are two or more direct-reply aircraft that each receive reply messages from three or more ground transceivers, where the two sets of the three or more ground transceivers need not to be identical, an eavesdropping aircraft that receives these ADS-B messages and corresponding reply messages transmitted by the ground transceivers can determine its own position and the positions of each of the direct-reply aircraft when the eavesdropping aircraft's velocity is used for positioning processing.

When velocity data is not available and integration across multiple time instances is necessary, the present invention enables the eavesdropping aircraft to solve for the velocity in addition to position. In this case to solve for horizontal position as well as velocity, a total of four unknowns need to be solved for the eavesdropping aircraft. Here it is assumed that the integration time is no more than few seconds such that acceleration can be neglected. Note that if a longer integration time is needed, acceleration will need to be estimated as well. Given the four unknowns from the eavesdropping aircraft and two unknowns for each direct-reply aircraft, when there is one direct-reply aircraft, six ground transceivers are required. When there are two or three direct-reply aircraft, four ground transceivers are required. When there are four or more direct-reply aircraft, three ground transceivers are required.

Another aspect of the present invention discloses that the combination or integration of a Distance Measuring Equipment (DME) range estimate into the position estimation processing when velocity data is used can reduce the required number of ground transceivers. For example, the required number of ground transceivers is reduced to two when two or more DME range measurements are integrated into the processing that includes ADS-B messages from one or more direct-reply aircraft and reply messages from two or more ground transceivers. The DME range measurements help resolve the horizontal position of the eavesdropping aircraft and only the horizontal position of the direct-reply ADS-B aircraft and the transmission time of its ADS-B message need to be solved. In this case the condition (1+N)K≥3K must be met such that after rearrangement N≥2 is obtained.

Another embodiment of present invention includes stationary ground reference transmitters (RefTrans) that broadcast ADS-B or ADS-B-like messages for the ground transceivers and eavesdropping aircraft to receive and to which the ground transceivers transmit reply messages. In this case, the ADS-B or ADS-B-like messages broadcast by the RefTran includes identity information and precise position information for the RefTran which are received and time-stamped by the eavesdropping aircraft. After a ground transceiver receives the RefTran broadcast message, the ground transceiver responds to the received RefTrans message after a random delay that is precisely known and included in the reply message of the ground transceiver, which is similar to the reply message transmitted by the ground transceiver in response to the selected ADS-B message from the direct-reply aircraft. A eavesdropping aircraft receives the RefTran's broadcast ADS-B or ADS-B-like message and corresponding reply messages transmitted from the ground transceivers and calculates its own position based on the arrival times of these messages and the known positions of the RefTran and ground transceivers and the known delays of the reply messages transmitted by the ground transceivers. In this case, since the RefTran position is known, only the position of the eavesdropping aircraft needs to be calculated and a minimum of two ground transceivers are needed to calculate the position. Referring to FIG. 1, given $z_a$, $x_b$, $y_b$, $z_b$, $t_b$, $t_1$ . . . $t_N$, and $\tau_1$ . . . $\tau_N$, the unknown horizontal positions $(x_a, y_a)$ and unknown transmitting time of the ADS-B message or ADS-B like, $t_0$, can be estimated by solving the following linearly independent non-linear equations:

$$C(t_b - t_0) = \sqrt{(x_a - x_b)^2 + (y_a - y_b)^2 + (z_a - z_b)^2}$$

$$C(t_1 - \tau_1 - t_0) = \sqrt{(x_a - x_1)^2 + (y_a - y_1)^2 + (z_a - z_1)^2} +$$
$$\sqrt{(x_1 - x_b)^2 + (y_1 - y_b)^2 + (z_1 - z_b)^2}$$

$$\vdots$$

$$C(t_N - \tau_N - t_0) = \sqrt{(x_a - x_N)^2 + (y_a - y_N)^2 + (z_a - z_N)^2} +$$
$$\sqrt{(x_N - x_b)^2 + (y_N - y_b)^2 + (z_N - z_b)^2}$$

(N≥2)

The position of the eavesdropping aircraft can be determined further by combining the measurements of ADS-B messages from the direct-reply aircraft and reply messages from the ground transceivers (i) when an inertial sensor is used, (ii) when the messages arrive close in time, or (iii) when the eavesdropping aircraft is moving at a low speed, as described in the previous embodiments.

Another embodiment of present invention discloses limiting the transmission power of each ground transceiver for a reply message in order to limit the spectrum impact. Because there is a practical limit to the number of transmissions that each ground transceiver can emit before the transmissions start interfering with other signals transmitted in the same frequency bands, the present invention teaches that the system shall limit the total number of direct-reply aircraft to which each ground transceiver may transmit reply messages and the system shall limit the transmitting power of each ground transceiver for a reply message to minimize the coverage area of each reply message transmission. An example of the calculation of the total number of direct-reply aircraft to which a ground transceiver can respond is as follows:

Assume that the ground transceivers transmit reply messages to selected ADS-B messages on 1030 MHz links and assume that the maximum number of ground transceivers in view of any direct-reply aircraft transponder (e.g., ADS-B emitter) at any moment in the airspace is capped at 8 units (Note that the capping is achieved via transmitting power limiting schemes in high unit density regions), if the allowable transponder occupancy rate is capped at 2%, because each 1030 MHz response occupies the transponder for roughly 50 microseconds, the maximum number of reply messages each ground transceiver can transmit in each second can be calculated as follows:

$$1*0.02/(50e-6*8)=50,$$

Thus, at a one (1) Hz transmission rate, each ground transceiver can respond to messages from up to 50 direct-reply aircraft and rudimentarily each ground transceiver may receive a quota of 6 or 7 direct-reply aircraft (that are not yet selected by any other transceivers) for selection according to its own discretion. The selection of the direct-reply aircraft is first based on altitude if horizontal position information is not available, then it will be based on position where the ADS-B messages convey accurate position information.

In another embodiment of the present invention, the selection of the direct-reply aircraft is based on the flight plan filing status of each aircraft. Aircraft that have a flight plan on file can be selected with higher priority than aircraft without a flight plan. This status information can be inferred from an aircraft's ADS-B message in which only aircraft with a flight plan will have a call sign being transmitted in the ADS-B message. Aircraft without a flight plan filed transmit only the aircraft's registration number. As a rule of thumb in this embodiment, part of the quota is reserved for high-altitude direct-reply aircraft as the high-altitude direct-reply aircraft will cover the most area, and part of the quota is reserved for the lowest flying direct-reply aircraft, which can be seen by the fewest ground transceivers but may require reply messages from ground transceivers to derive range information for navigation. The use of 1030 MHz link for ground response transmission is advantageous because it takes advantages of the existing ground-air communication backbone in which all transponder equipped aircraft transmit on 1090 MHz and receive on 1030 MHz such that no new-frequency operation is needed. The use of 1090 MHz link for ground response transmission is also advantageous because it takes advantage of existing MODE-S Extended Squitter (ES) based ADS-B OUT (transmit) avionics and ADS-B IN (receive) avionics.

In another embodiment of the present invention, the selection of a direct-reply aircraft for constructing PR-EPR equations for own-aircraft navigation is limited to manned aircraft. In ADS-B messages, the "Emitter Category" data of the "Extended Squitter Identification and Category Message" is indicative of the ADS-B transmitting aircraft's types information which includes unmanned aerial vehicles (UAV). If such indicator is not available (if the Emitter Category is rendered "unknown") directly from ADS-B messages, it can be obtained from the aircraft registration database based on MODE-S address or registration number. Commercial databases that correlate address or registration number to aircraft type and model exist. A ground transceiver uses this method to distinguish a drone from manned aircraft and includes in the reply message an indicator indicating whether the reply is responding to a manned aircraft or a drone (e.g., '0' for manned, '1' for drone). Direct indication of a UAV type may also be obtained by interrogating a transponder to retrieve the data in the transponder register BDS 0,8. These measures assist the avionics systems with flexibility in selecting only manned aircraft for computing navigation solutions.

Another embodiment of the present invention discloses that when a communication network exists to connect the ground transceivers to a central server, the selection of the direct-reply aircraft can be managed at the central server. The ground transceivers relay the ADS-B report information to the central server and the central server assigns the direct-reply aircraft for each ground transceiver on the network for transmission of reply messages based on a predictive analysis of the current traffic in the covered air space. For example, the central server has the capability to know the position of each reported aircraft for a predetermined time period, for example a few seconds, and thus it can predict for any aircraft, which direct-reply aircraft and corresponding ground transceivers have a good line of sight to each other, and the position accuracy of the aircraft can be determined based on the geometry of the positions of the aircraft, the direct-reply aircraft and associated ground transponders. If the predicted accuracy is not sufficient, the central server will attempt to improve the accuracy by commanding ground transceivers to start responding to specified aircraft even if there are no resources (quota) remaining. If resources are not available, the central server will free up ground transceiver resources allocated to other direct-reply aircraft that are redundant or underutilized.

Another embodiment of present invention discloses a means to enhance the range-range positioning solution of the ADS-B emitter whose ADS-B messages are being responded to by ground transceivers. For an ADS-B emitter whose GPS source is under interference or jamming, its position can be calculated from the round-trip ranges to the ground transceivers. Such position estimation is further improved when ADS-B messages from other ADS-B emitters and ground transceiver reply messages are available based on the RTR plus EPR-PR method previously discussed.

As illustrated by the aforementioned embodiments, the present invention is highly adaptive to the air space density. For example, when there are only a few aircraft present in the airspace, all of the aircraft present will benefit from RTR and EPR-PR navigation and when there are many aircraft present in the airspace, some aircraft will still benefit from RTR and EPR-PR navigation, and remaining aircraft will benefit purely from the EPR-PR via the abundant ADS-B emissions and reply messages available in the airspace, as seen in performance simulations shown in FIGS. 7-10.

Another embodiment of present invention discloses a means of validating ADS-B position information for a direct-reply aircraft by comparing the decoded position transmitted by the direct-reply aircraft in the ADS-B message against the determined position by an eavesdropping aircraft using diverse-ranging processing. Position information reported by a direct-reply aircraft via the existing ADS-B system is not protected against false position reporting and a direct-reply aircraft can transmit erroneous or misleading information, which poses a security and safety threat to the normal operation of aircraft. The present invention provides the eavesdropping aircraft and other direct-reply aircraft with the means to determine its own position as well as the positions of other direct-reply aircraft independent of GPS or reported GPS positions by the direct-reply aircraft, such that the determined positions are used for validating the reported position information of the direct-reply aircraft. The ADS-B position information transmitted by a direct-reply aircraft is validated when the difference between the reported position and the calculated position is within a predetermined threshold. If GPS jamming or other interference is present intermittently or for short periods of time, outside of the periods of GPS jamming and/or interference, the GPS position of the eavesdropping aircraft is determined to be valid and only the position of the direct-reply aircraft needs to be calculated. In this case, only two ground transceivers are needed. In this case, the estimation problem becomes as follows: Given $x_a$, $y_a$, $z_a$, $z_b$, $t_b$, $t_1 \ldots t_N$, and $\tau_1 \ldots \tau_N$, the horizontal positions $(x_b, y_b)$ and transmitting time of the ADS-B message, to, can be estimated and GPS position information contained in the ADS-B message can be validated by solving the following linearly independent non-linear equations:

$$C(t_b - t_0) = \sqrt{(x_a - x_b)^2 + (y_a - y_b)^2 + (z_a - z_b)^2}$$

$$C(t_1 - \tau_1 - t_0) = \sqrt{(x_a - x_1)^2 + (y_a - y_1)^2 + (z_a - z_1)^2} + \sqrt{(x_1 - x_b)^2 + (y_1 - y_b)^2 + (z_1 - z_b)^2}$$

$$\vdots$$

$$C(t_N - \tau_N - t_0) = \sqrt{(x_a - x_N)^2 + (y_a - y_N)^2 + (z_a - z_N)^2} + \sqrt{(x_N - x_b)^2 + (y_N - y_b)^2 + (z_N - z_b)^2}$$

(N≥2)

Another embodiment of present invention discloses a means of conducting eavesdropping aircraft navigation when the position of the direct-reply aircraft is broadcast and is used by the eavesdropping aircraft for calculating own-aircraft position. The position of the direct-reply aircraft is the position at or near the time the ADS-B message was transmitted. The position information of the direct-reply aircraft can be decoded from the ADS-B message by a GPS receiver when the GPS receiver is outside of interference or jamming zones, or the position information of the direct-reply aircraft can be calculated from the range-range positioning as well as PR-EPR positioning based on the method of present invention. Without having to resolve the position of the direct-reply aircraft, the eavesdropping aircraft needs fewer ground transceivers transmitting reply messages to calculate own-aircraft position. The calculated position is then tracked and interpolated to the present time for navigation and ADS-B reporting. When more than two direct-reply aircraft are available, only one ground transceiver transmitting reply messages is needed. This is assuming that either the two ADS-B messages arrive close in time or velocity data is used to integrate two instances so only the initial eavesdropping aircraft position needs to be solved and the second position is interpolated relative to the initial position using the velocity data. In this case, each direct-reply aircraft and ground transceiver provides one EPR-PR equation such that two direct-reply aircraft are sufficient to solve for the initial eavesdropping aircraft horizontal position. When there is only one direct-reply aircraft, two ground transceivers are required and no inertial sensor integration is necessary. When velocity data is not available and integration across multiple time instances is necessary, the present invention can solve for velocity in addition to just position. In this case to solve for horizontal position as well as velocity, a total of four unknowns need to be solved. If there are two or three direct-reply aircraft, two ground transceivers are needed. If there are four or more direct-reply aircraft, only one ground transceiver is required. Here it is assumed that the integration time is no more than few seconds such that acceleration can be neglected. Note that if a longer integration time is needed, acceleration will need to be estimated as well.

Another embodiment of present invention discloses a means of synchronizing ground transceivers when the position of the direct-reply aircraft is broadcast and is used by ground transceivers for calculating the transmission time of the ADS-B message by the direct-reply aircraft. Ground transceivers that are all in view of a direct-reply aircraft can synchronize using the ADS-B transmission as a signal of opportunity to a reference ground transceiver among the ground transceivers sharing the common view of the direct-reply aircraft. For example, a first ground transceiver timestamps the receiving time at T1 and calculates the propagation delay dt1 based on the reported direct-reply aircraft position at the time of transmission and own position, the transmission time with respect to its own clock is then T1−dt1. A second ground transceiver that is to be synchronized to the first ground transceiver, timestamps its receiving time of the ADS-B message at T2 and calculates the propagation delay dt2 and obtains the transmission time of the ADS-B message T2−dt2 with respect to its clock. To synchronize the second ground transceiver's clock to the first ground transceiver's clock, the second ground transceiver simply corrects (adding) its time by the amount of (T1−dt1)−(T2−dt2). Once the ground transceivers are synchronized, the ground transceivers can periodically broadcast the common clock time at a time of transmission at each ground transceiver. For aircraft at known locations, upon receiving the clock time broadcast by a ground transceiver, the aircraft adjusts its clock to the ground transceiver's clock. For example, a ground transceiver broadcasts its clock time at T0 with respect to the ground transceiver's time, which is the transmission time of the broadcast message. An aircraft receives the message at t1 with respect to the aircraft time. Knowing the propagation delay dt from the ground transceiver to the aircraft, the aircraft can then adjust its clock by adding (dt+T0−t1) to its local time such that its clock and the ground transceiver's clock are on the same time base.

Ground transceiver synchronization is necessary for ground transceivers to multilaterate the position of aircraft. Ground transceiver and aircraft synchronization is necessary for both to transmit Universal Access Transceiver (UAT) messages which are aligned to Message Start Opportunity (MSO) time slots which require the ground transceivers and aircraft to be on a common time base.

When two or more direct-reply aircraft are in view of a group of ground transceivers, the ground station transceivers synchronize to each other using the ADS-B messages broadcast by these direct-reply aircraft as signals of opportunity. All ground transceivers produce the time corrections relative to a preselected reference ground transceiver for each signal of opportunity and use the time correction to adjust their clocks. Note that time synchronization can be carried out in "paper clock" form in which time corrections are tracked over the observation period and applied to the clock reading and no physical adjustment to the clock time and frequency is carried out.

Among groups of ground transceivers that do not share a common view to the same direct-reply aircraft, as long as there are at least one from each group that is in common view to an direct-reply aircraft, the clock time difference between the two groups can be estimated and all ground transceivers can be synchronized to a preselected reference ground transceiver.

Figure 11:
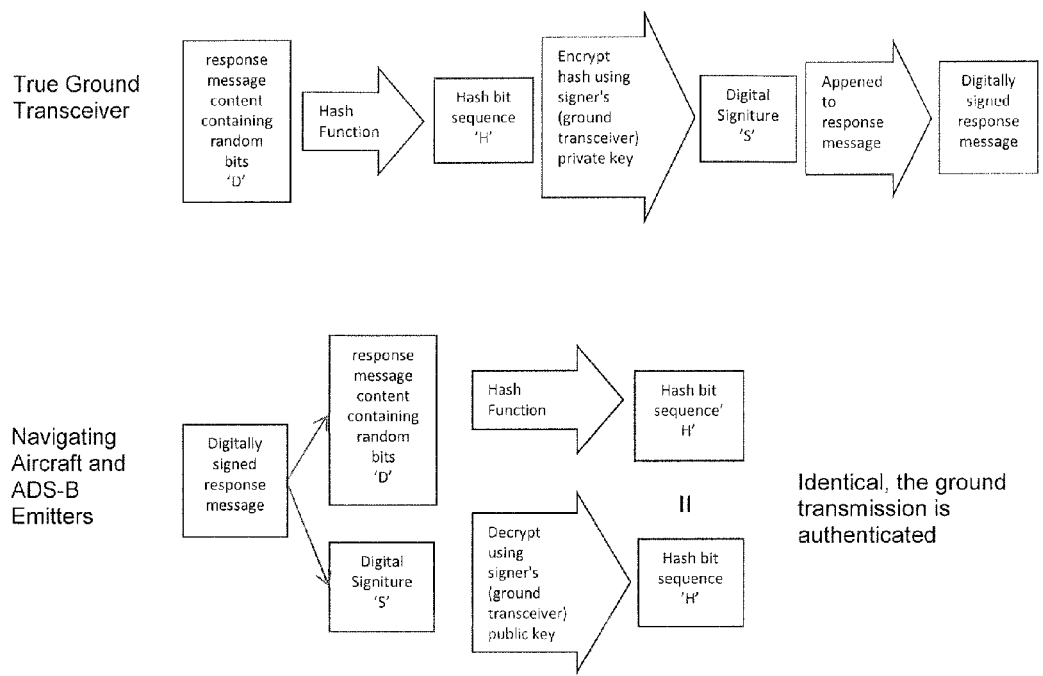
FIG. 11 illustrates a successful authentication of a ground transceiver identity using an authentication process of one embodiment of the present invention.
Figure 12:
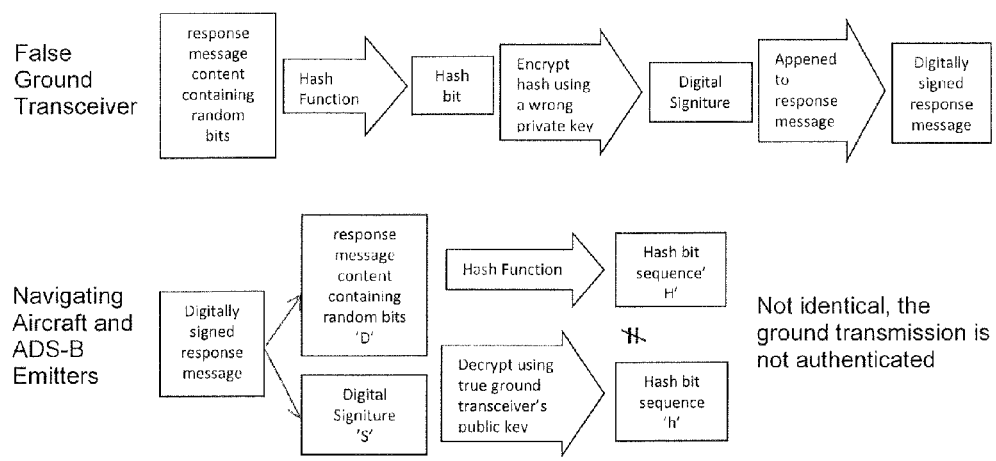
FIG. 12 illustrates an unsuccessful authentication of a ground transceiver identity using an authentication process of one embodiment of the present invention.

Another embodiment of present invention discloses a means of authenticating a ground transceiver's identity using a public-key-encryption based digital-signature scheme. In this embodiment, each ground transceiver maintains and periodically updates a secret key and generates the associated public key. The public key information is made known to the eavesdropping aircraft and the direct-reply aircraft via ground-air communication links, such as being broadcasted via TIS-B, FIS-B, VDL-2 or any other means. In the reply messages, a sequence of random bits are included, a hash sequence is generated from the entire reply message and a digital signature bit sequence is generated based on the hash sequence and the secret key and is appended to the reply message. At the eavesdropping aircraft and/or the direct-reply aircraft, upon receiving the reply message and the appended digital signature, the bit sequence is decrypted from the digital signature using the public key of the ground transceiver and the ground transceiver is authenticated when the decrypted bit sequence is identical to a hash bit sequence derived from the received reply message content using the same hash function as the ground transceiver. FIG. 11 and FIG. 12 illustrate the process of validating a ground transceiver's response by an eavesdropping aircraft or a direct-reply aircraft, where the ground transmission is authenticated in FIG. 11, while the ground transmission is not authenticated in FIG. 12 because the decrypted hash bit sequence from the digital signature, whose construction requires the true private key which is kept secret by the authentic ground transceiver, does not match with the hash derived from the reply message content.

Figure 13:
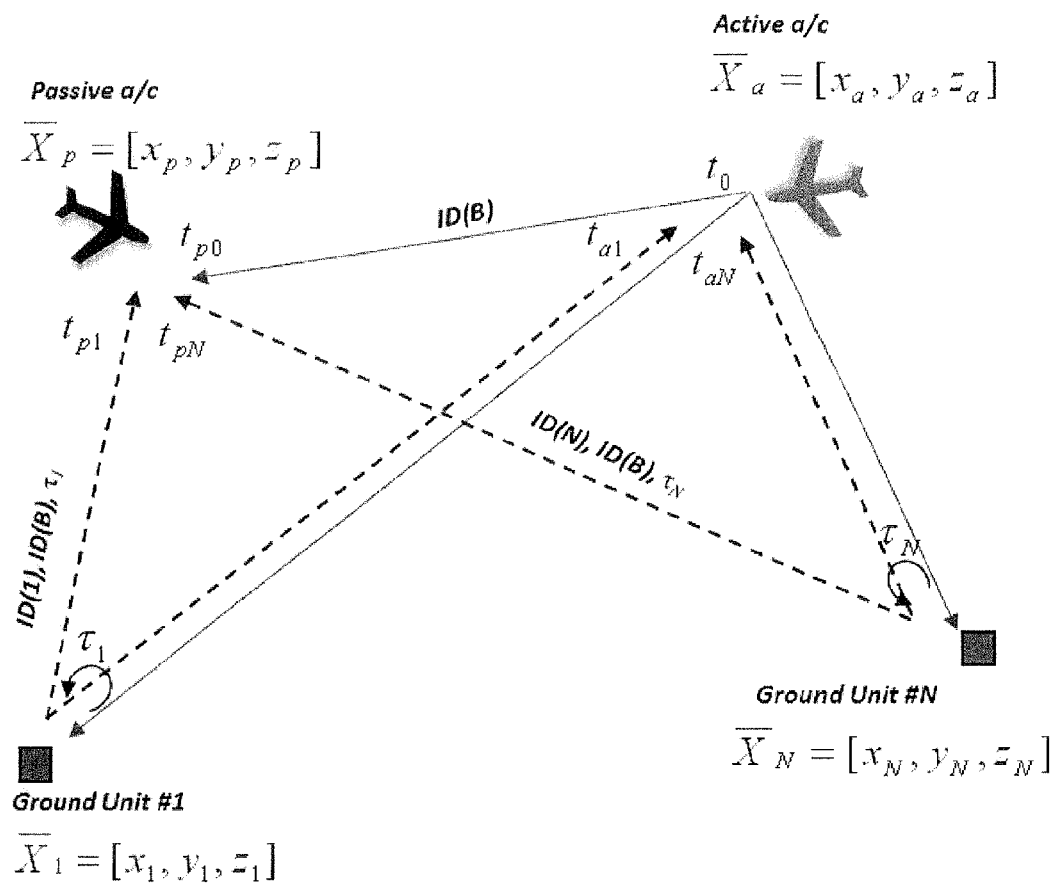
FIG. 13 is a diagram illustrating the present invention of diverse-ranging means and notations for aircraft navigation.

With reference to the notations of FIG. 13, based on the diverse-ranging capability of the present invention, the formulations of the at least six functions are explained in the following sections. In addition, additional time distribution function is also disclosed.

Function #1: Air Validation

For an eavesdropping aircraft to determine whether the reported position in an ADS-B message transmitted by an direct-reply aircraft is valid, the eavesdropping aircraft can check if the position information fits the EPR-PR equations formed from the timestamp measurements.

Information under test: $x_a$ $y_a$ ($z_a$)

Known to eavesdropping aircraft: $x_p$ $y_p$ $z_p$ and $\tau_j$ $x_j$ $y_j$ $z_j$ (j=1 ... N)

Measurable by eavesdropping aircraft: $t_{p0}$ and $t_{pj}$ (j=1 ... N)

Unknown to eavesdropping aircraft: $t_0$

Each direct-reply aircraft provides to the eavesdropping aircraft:

1 Pseudo Range (PR) Equation:

$$C(t_{p0}-t_0)=\sqrt{(x_p-x_a)^2+(y_p-y_a)^2+(z_p-z_a)^2}$$

N Echoed Pseudo Range (EPR) Equations (j=1 ... N):

$$C(t_{pj}-\tau_j-t_0)=\sqrt{(x_p-x_j)^2+(y_p-y_j)^2+(z_p-z_j)^2}+\sqrt{(x_j-x_a)^2+(y_j-y_a)^2+(z_j-z_a)^2}$$

N "EPR–PR" Equations where $t_0$ is removed (j=1 ... N):

$$C(t_{pj}-\tau_j-t_{p0})=\sqrt{(x_p-x_j)^2+(y_p-y_j)^2+(z_p-z_j)^2}+\sqrt{(x_j-x_a)^2+(y_j-y_a)^2+(z_j-z_a)^2}-\sqrt{(x_p-x_a)^2+(y_p-y_a)^2+(z_p-z_a)^2}$$

The eavesdropping aircraft validates the ADS-B information reported by the direct-reply aircraft either (i) by checking the consistency with the EPR-PR equation or (ii) by directly solving the position if there are reply messages transmitted by multiple ground transceivers to the ADS-B message from the direct-reply aircraft.

Function #2: Ground Validation by Direct-Reply Aircraft

For a direct-reply aircraft to determine whether a reported position of a ground transceiver is valid, the direct-reply aircraft can check whether the reported position information fits the RTR equations formed from the timestamp measurements.

Information under test: $x_j$ $y_j$ $z_j$ j∈{1 ... N}

Known to direct-reply aircraft: $t_0$ $x_a$ $y_a$ $z_a$ and $\tau_j$ j∈{1 ... N}

Measurable by direct-reply aircraft: $t_{p0}$ and $t_{aj}$ j∈{1 ... N}

Each replying ground unit provides the direct-reply aircraft with:

1 Round-trip Range (RTR) Equation, j∈{1 ... N}:

$$C(t_{aj}-\tau_j-t_0)/2=\sqrt{(x_j-x_a)^2+(y_j-y_a)^2+(z_j-z_a)^2}$$

The reported position of the ground transceiver is determined to be invalid when the fitting error is greater than a predefined tolerance, and the reported position of the ground transceiver is determined to be valid when the fitting error is no greater than the tolerance (consistency test).

$$\text{Fitting Error}=|C(t_{aj}-\tau_j-t_0)/2-\sqrt{(x_j-x_a)^2+(y_j-y_a)^2+(z_j-z_a)^2}|$$

Function #2: Ground Validation by Eavesdropping Aircraft

For an eavesdropping aircraft to determine whether a reported position of a ground transceiver is valid, the eavesdropping aircraft can check whether the reported position information fits the PR and EPR equations formed from the timestamp measurements.

Information under test: $x_j$ $y_j$ $z_j$ j∈{1 ... N}

Known to eavesdropping aircraft: $x_p$ $y_p$ $z_p$ $x_a$ $y_a$ $z_a$ and $\tau_j$ j∈{1 ... N}

Measurable by eavesdropping aircraft: $t_{p0}$ and $t_{pj}$ j∈{1 ... N}

Unknown to eavesdropping aircraft: $t_0$

Each direct-reply aircraft provides to the eavesdropping aircraft with respect to the j-th ground transceiver:

1 Pseudo Range (PR) Equation:

$$C(t_{p0}-t_0)=\sqrt{(x_p-x_a)^2+(y_p-y_a)^2+(z_p-z_a)^2}$$

1 Echoed Pseudo Range (EPR) Equations, j∈{1 ... N}:

$$C(t_{pj}-\tau_j-t_0)=\sqrt{(x_p-x_j)^2+(y_p-y_j)^2+(z_p-z_j)^2}+\sqrt{(x_j-x_a)^2+(y_j-y_a)^2+(z_j-z_a)^2}$$

1 "EPR–PR" Equations where to is removed, j∈{1 ... N}:

$$C(t_{pj}-\tau_j-t_{p0})=\sqrt{(x_p-x_j)^2+(y_p-y_j)^2+(z_p-z_j)^2}+\sqrt{(x_j-x_a)^2+(y_j-y_a)^2+(z_j-z_a)^2}-\sqrt{(x_p-x_a)^2+(y_p-y_a)^2+(z_p-z_a)^2}$$

The eavesdropping aircraft determines the reported position of the ground transceiver is valid either (i) by checking the consistency with the EPR-PR equation or (ii) by directly solving for the position of the ground transceiver when there are multiple direct-reply aircraft being replied to by the ground transceiver.

Function #3: Own-Aircraft Positioning in GPS Jamming

A direct-reply aircraft determines own-aircraft position using RTR to two or more ground units and transmits its determined position in an ADS-B message. The eavesdropping aircraft receives the ADS-B message transmitted by the direct-reply aircraft and reply messages transmitted by ground transceivers and calculates own-aircraft position by solving the PR and EPR equations.

Known to eavesdropping aircraft: $x_a$ $y_a$ $z_a$ $z_p$ and $\tau_j$ $x_j$ $y_j$ $z_j$ (j=1 ... N)

Measurable by eavesdropping aircraft: $t_{p0}$ and $t_{p1}$ ... $t_{pN}$

To be solved by eavesdropping aircraft: $x_p$ $y_p$ $t_0$

Each direct-reply aircraft provides to the eavesdropping aircraft:

1 Pseudo Range (PR) Equation:

$$C(t_{p0}-t_0)=\sqrt{(x_p-x_a)^2+(y_p-y_a)^2+(z_p-z_a)^2}$$

N Echoed Pseudo Range (EPR) Equation (j=1 ... N):

$$C(t_{pj}-\tau_j-t_0)=\sqrt{(x_p-x_j)^2+(y_p-y_j)^2+(z_p-z_j)^2}+\sqrt{(x_j-x_a)^2+(y_j-y_a)^2+(z_j-z_a)^2}$$

The eavesdropping aircraft require reply messages from at least 2 ground transceivers. The RTR/RTR positioning by direct-reply aircraft resembles DME/DME but is 10× more accurate due to larger signal bandwidth. A more robust solution is found iteratively using a Maximum-Likelihood Estimator by assuming Gaussian measurement errors. The final position $(x_p, y_p)$ solution is fused from distinct solutions derived from all available direct-reply aircraft messages and reply messages transmitted by ground transceivers.

Function #4: Simultaneous Navigation & Air Validation in Jamming

A direct-reply aircraft transmits an ADS-B message that contains position information that is valid or may be corrupted. The eavesdropping aircraft receives the ADS-B message and reply messages transmitted by ground transceivers and calculates own-aircraft position and the position of the direct-reply aircraft by solving the PR and EPR equations.

Known to eavesdropping aircraft: $z_a$ $z_p$ and $\tau_j$ $x_j$ $y_j$ $z_j$ (j=1 ... N)

Measurable by eavesdropping aircraft: $t_{p0}$ and $t_{pj}$ (j=1 ... N)

To be solved by eavesdropping aircraft: $x_p$ $y_p$ $x_a$ $y_a$ $t_0$

Each direct-reply aircraft provides to the eavesdropping aircraft:

1 Pseudo Range (PR) Equation:

$$C(t_{p0}-t_0)=\sqrt{(x_p-x_a)^2+(y_p-y_a)^2+(z_p-z_a)^2}$$

N Echoed Pseudo Range (EPR) Equation (j=1 ... N):

$$C(t_{pj}-\tau_j-t_0)=\sqrt{(x_p-x_j)^2+(y_p-y_j)^2+(z_p-z_j)^2}+\sqrt{(x_j-x_a)^2+(y_j-y_a)^2+(z_j-z_a)^2}$$

To determine own position and the position of the direct-reply aircraft requires reply message from at least 4 ground transceivers with 1 direct-reply aircraft, or reply messages from at least 3 ground transceivers with 2 or more direct-reply aircraft.

Function #5: Simultaneous Navigation & Ground Validation in Jamming

A direct-reply aircraft transmits an ADS-B message that contains position information that is valid or may be corrupted. The eavesdropping aircraft receives the ADS-B message and reply messages transmitted by ground transceivers and calculates own-aircraft position and the position of the direct-reply aircraft by solving the PR and EPR equations.

Known to eavesdropping aircraft: $x_a$ $y_a$ $z_a$ $z_p$ and $\tau_j$ $x_j$ $y_j$ $z_j$ (j=1 ... N)

Measurable by eavesdropping aircraft: $t_{p0}$ and $t_{pj}$ (j=1 ... N)

To be solved by eavesdropping aircraft: $x_p$ $y_p$ $t_0$

Information under test: $x_j$ $y_j$ $z_j$ j∈{1 ... N}

Each direct-reply aircraft provides to the eavesdropping aircraft:

1 Pseudo Range (PR) Equation:

$$C(t_{p0}-t_0)=\sqrt{(x_p-x_a)^2+(y_p-y_a)^2+(z_p-z_a)^2}$$

N Echoed Pseudo Range (EPR) Equation (j=1 ... N):

$$C(t_{pj}-\tau_j-t_0)=\sqrt{(x_p-x_j)^2+(y_p-y_j)^2+(z_p-z_j)^2}+\sqrt{(x_j-x_a)^2+(y_j-y_a)^2+(z_j-z_a)^2}$$

In order for the eavesdropping aircraft to determine whether the reported position of the j-th ground transceiver is valid, N+1 ground transceivers are required where N is the minimal number of ground transceivers required for resolving $(x_p, y_p, t_0)$. In this case, N=2. The validation procedure follows typical fault isolation method by solving own-aircraft position N times, each time using EPR's from only N−1 ground transceivers, and a faulty position of a ground transceiver will result in an outlier own-aircraft solution which can be detected.

For example, in one embodiment, the direct-reply aircraft is in an area in which GPS signals are subject to RF interference or jamming and the position data being transmitted by the direct-reply aircraft in the broadcast message is degraded. In this embodiment, the ground transceivers receive the broadcast message transmitted by the direct-reply aircraft, and select and transmit reply message to the broadcast messages from several other direct-reply aircraft. The eavesdropping aircraft receive the broadcast messages transmitted by the direct-reply aircraft and corresponding reply messages transmitted by the ground transceivers and simultaneously or separately (i) determine their own-aircraft position, (ii) determine the position of one or more of the direct-reply aircraft, and (iii) validate the reported position of one or more of the ground transceivers transmitting reply messages.

Function #6: Simultaneous Navigation, Ground Validation, & Air Validation in Jamming A direct-reply aircraft transmits an ADS-B message that contains position information that is valid or may be corrupted. The eavesdropping aircraft receives the ADS-B message and the reply messages and calculates own-aircraft position and the position of the direct-reply aircraft by solving the PR and EPR equations.

Known to eavesdropping aircraft: $z_a$ $z_p$ and $\tau_j$ $x_j$ $y_j$ $z_j$ (j=1 ... N)

Measurable by eavesdropping aircraft: $t_{p0}$ and $t_{pj}$ (j=1 ... N)

To be solved by eavesdropping aircraft: $x_p$ $y_p$ $x_a$ $y_a$ $t_0$

Information under test: $x_j$ $y_j$ $z_j$ j∈{1 ... N}

Each direct-reply aircraft provides to the eavesdropping aircraft:

1 Pseudo Range (PR) Equation:

$$C(t_{p0}-t_0)=(x_p-x_0)^2+(y_p-y_a)^2+(z_p-z_a)^2$$

N Echoed Pseudo Range (EPR) Equation (j=1 ... N):

$$C(t_{pj}-\tau_j-t_0)=\sqrt{(x_p-x_j)+(y_p-y_j)^2+(z_p-z_j)^2}+\sqrt{(x_j-x_a)^2+(y_j-y_a)^2+(z_j-z_a)^2}$$

In order for the eavesdropping aircraft to determine whether the position of the j-th ground transceiver is valid, N+1 ground transceiver are required where N is the minimal number of ground transceivers required for resolving $(x_p, y_p, x_a, y_a, t_0)$. And in this case, N=3 if there is more than one direct-reply aircraft, and N=4 if there is only one direct-reply aircraft. The validation follows fault isolation methodology by solving for own-aircraft positions N times, each time using EPR's from only N−1 ground transceivers, and a faulty position of a ground transceiver will result in an outlier own-aircraft solution which can be detected.

Another embodiment of present invention resolves the time latency uncertainty of the calculated position broadcast by the direct-reply aircraft. It is possible that the time a position is calculated by a direct-reply aircraft differs from the time the position data is transmitted. This introduces an error to the diverse-ranging processing on the eavesdropping aircraft's end. The error in the broadcast position is the difference between the position indicated by the position data and the actual position when the position data is transmitted and the direction and length of this error depends on the direct-reply aircraft's velocity and the actual latency. When the latency is zero or small enough, the error may be neglected which is the case assumed by previous embodiments of the present invention. When the error is not negligible, the actual transmission position needs to be better resolved. Based on the velocity data, which is broadcast by the direct-reply aircraft in ADS-B messages, one needs only to determine on which point on the line extending from the position indicated by the position data toward the direction indicated by the velocity data of the direct-reply aircraft. This line is also bounded by the maximum latency allowed by the system, which is 0.6 seconds. Since it is a problem of solving a point on a given line, it is a one-dimensional problem to be solved along with the normal diverse-ranging processing tasks. In this case, an additional unknown variable needs to be solved for each direct-reply aircraft in addition to the unknown position variables of the eavesdropping aircraft's. For example, if there are K direct-reply aircraft (i.e. k=1, 2, . . . K) and N ground transceivers, for the eavesdropping aircraft to calculate own-aircraft position using the K PR measurement, the N*K EPR measurements, the altitude data of all aircraft, and the broadcast positions of all direct-reply aircraft and ground transceivers, there are 2+2*K unknown variables (the horizontal position of the eavesdropping aircraft, the one-dimensional latency and the time of transmission of each direct-reply aircraft broadcast messages) to be solved using the K+N*K EPR and PR measurements. For the problem to be solvable, it is required that 2+2*K≤K+N*K, which is equivalent to N≥2/K+1. As a result, at least three ground transceivers are required when only one direct-reply aircraft is present. At least two ground transceivers are required when two or more direct-reply aircraft are present.

Another embodiment of present invention allows the ground-transceiver time delay information to be transmitted in a later message. For each ground reply message, a message counter value (for example a 3 bit counter increases from 1 to 8 and then rolls back to 1 every time a reply message is transmitted) is included in the message for differentiating individual messages transmitted by a ground transceiver as replies to the same aircraft. A message counter is maintained independently for each aircraft by each ground transceiver. The ground-transceiver delay time information is then accompanied by a message counter data associated to the applicable message. As such, each ground transceiver reply message contains a current message counter and a message counter which is associated to the delay time information of a previous message. A special case exists when the two message counter values are identical. In this case, the time delay information applies to the current reply message. Such scheme applies to ground transceivers that cannot precisely determine the transmitting time before the reply message is transmitted as well as ground transceivers that can precisely determine the transmitting time before the reply message is transmitted. Within a configurable time window, a diverse-ranging APNT avionics upon receiving a reply message from a ground transceiver will wait for the delay time information to be transmitted in a later message. Correct time delay information can then be apply to a particular reply message correctly based on the message counter, ground transceiver address, and the direct-reply aircraft address.

Another embodiment of present invention computes the integrity data that is required of RNP and ADS-B using a combination of RTR, PR, EPR, altitude, and other information typically available to aircraft sensor systems such as DME range, airspeed, magnetic heading, and inertial reference system data. The integrity data in general includes two kinds of information—an integrity containment radius surrounding a solution and the probability of the true position being outside of the region enclosed by the integrity containment radius without detecting equipment. The former can be called an "integrity radius" and the latter can be called an "integrity level." The two values are always used in pairs. The present invention computes the integrity radius and integrity level using redundant RTR, PR, EPR, and altitude information, and performs fault detection and exclusion (FDE) when more redundant measurements are available. For aircraft equipped with DME, DME range measurements are also used for computing integrity data as well as for FDE. Depending on the availability, airspeed, magnetic heading, and inertial reference system data can also be used. The principle of integrity computation is based on a consistency check. For example, if two measurements are required for computing a solution, and only two measurements are given, no integrity computation can be performed. If there is a third measurement, three groups of two measurements can be formed and each group gives rise to a solution. If the three solutions are within a configurable distance to each other the solutions are deemed "consistent," otherwise they are "inconsistent." A fourth measurement is required to further identify a single faulty measurement. In this case, the three solutions containing the faulty measurement tend to be the outliers of the three other solutions that are consistent with each other. The configurable distance for the consistency check depends on the nominal distribution of measurement errors as well as the probability level one selects for the consistency check. In general, the shorter the configurable distance the higher the integrity standard that the solution will be checked against. There are many ways the integrity computation can be implemented and the applicable methods are not limited to the one disclosed.

Another embodiment of present invention calibrates an aircraft's RTR, PR, and EPR measurements by computing the clock frequency offset and clock frequency drift (changing rate of offset) using GPS positions or GPS pulse per second (PPS) outputs when GPS is available. It is well known that a quartz oscillator experiences long-term frequency drift due to aging effects. Without calibration, the operational frequency of an oscillator may slowly change over time. For lower-quality oscillators, such drifting effect may cause measurement errors that are not negligible and need to be corrected. The present invention computes the clock frequency offset and drift using GPS receiver outputs. When GPS PPS information is available, direct calculation of clock frequency offset can be performed simply by measuring the difference between the actual counts per second versus the correct counts (for example, a 10 MHz clock should results in 1e7 counts per second). When GPS PPS is not used and GPS position is used, the diverse-ranging position is computed iteratively using measurements assuming different clock frequency offset values and the clock frequency offset can be estimated as the one resulting in a position solution that is closest to the GPS position. Once multiple clock frequency offset measurements are obtained over a long period of time, the frequency drift or changing rate can then be computed. The present invention also includes the measuring of the frequency offset by connecting the avionics to a frequency reference or by comparing the RTR measurements with known true RTR produced by test equipment during aircraft routine maintenance. The measured frequency offset information is then input or keyed-in to the avionics for correcting RTR, PR, and EPR measurements until next scheduled maintenance.

Time Distribution Function

For all of the operation modes, the aircraft can be time synchronized to ground transceivers by further including ground system time information (e.g., a timestamp) in the reply messages of the ground transceivers. For an eavesdropping aircraft, by knowing own-aircraft position and the position of the ground transceivers, the eavesdropping aircraft can then synchronize its time to the time of the ground transceivers using the propagation delay of the signal derived from the distance between the eavesdropping aircraft and the ground transceiver. It is also possible for distributing time via air-to-air means given that the transmission time of an ADS-B message is now solvable by an eavesdropping aircraft.

Figure 14:
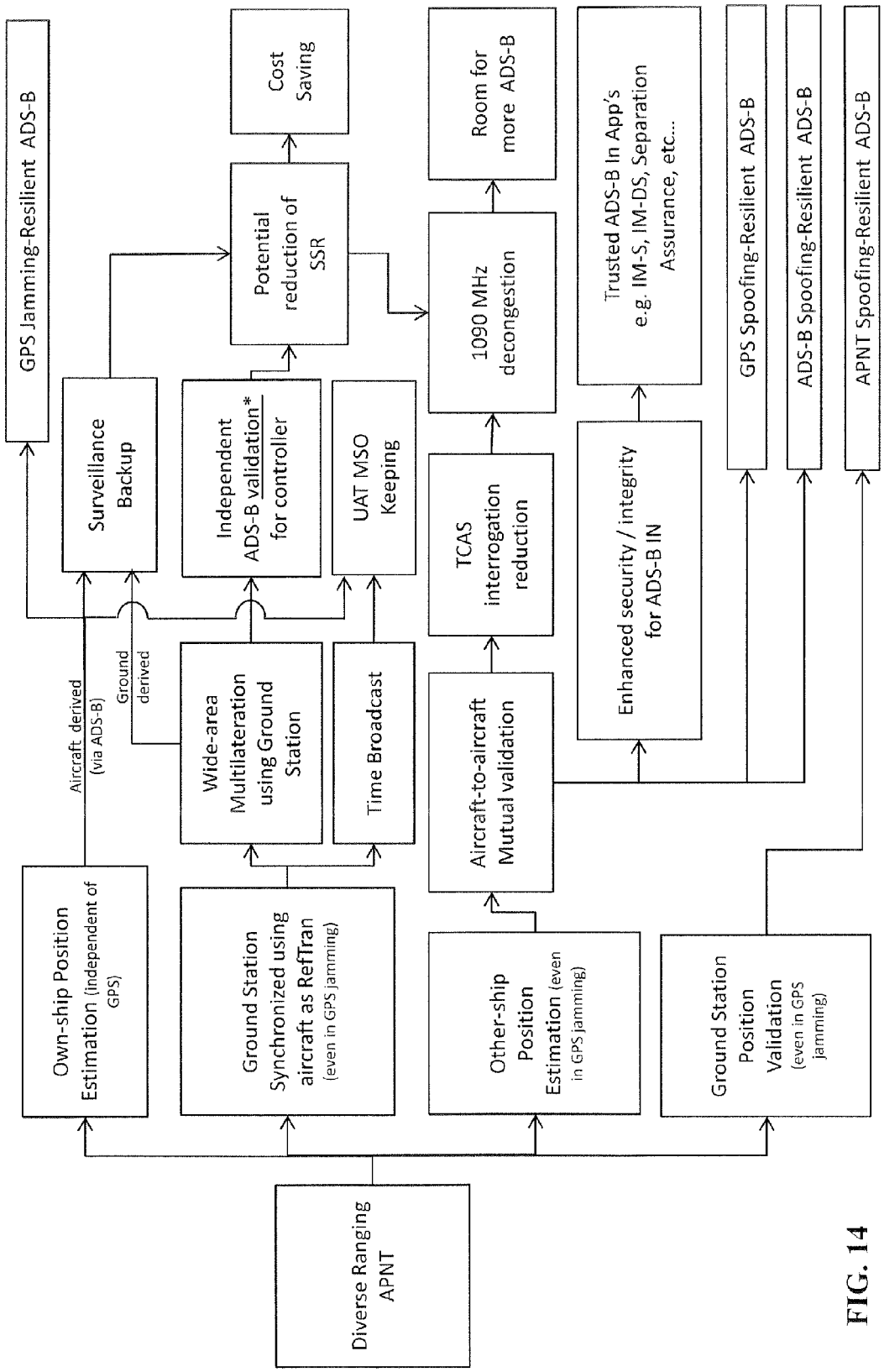
FIG. 14 provides a summary of the functions and advantages provided by the present invention.

In summary, the present invention is advantageous because it is entirely independent of GPS; requires no synchronization of ground transceivers; does not absolutely require network connection between the ground transceivers; the broadcast messages and reply messages are based on modified standard formats of existing messages, such as MODE-S and UAT message formats; the transmission rate of the present invention is very low such that spectrum impact is minimal; requires minimal enhancement over existing ADS-B IN/OUT avionics; requires relatively simple modification to ground transceiver functionality; provides sufficient navigation accuracy down to RNP 0.3NM or better performance level and it has unlimited capacity, such that the present invention is a unique and highly feasible means of navigation capable of providing alternative positioning and navigation services to aircraft. The functions and advantages provided by the present invention are summarized in FIG. 14.

It will be understood that various modifications and changes may be made in the present invention by those of ordinary skill in the art who have the benefit of this disclosure. All such changes and modifications fall within the spirit of this invention, the scope of which is measured by the following appended claims.

What is claimed:

1. A method of aircraft navigation and dependent surveillance using at least one broadcast message, the method comprising the steps of:
   transmitting and recording the transmission time of a first broadcast message at a first aircraft of a plurality of aircraft, the first broadcast message comprising at least identity information of the first aircraft;
   receiving and recording the receiving time of the first broadcast message from the first aircraft at a plurality of ground transceivers and at a second aircraft;
   transmitting a reply message to the first broadcast message from each of the plurality of ground transceivers, wherein each reply message comprises at least the ground transceiver's identity and a delay time from receiving the first broadcast message to transmitting the reply message for that ground transceiver;
   receiving and recording the receiving time of the reply messages transmitted by each of the plurality of ground transceivers at the first aircraft and the second aircraft;
   determining a first position of the first aircraft on the first aircraft from at least the transmission time data for the first broadcast message, the receiving time data and the delay time for each of the received reply messages and the positions of each of the plurality of ground transceivers;
   determining a second position of the first aircraft and a first position of the second aircraft on the second aircraft from at least the receiving time data for the first broadcast message, the receiving time data and the delay time for each of the received reply messages, and the positions of each of the plurality of ground transceivers;
   transmitting a second broadcast message from the first aircraft comprising at least the identity information and the first position of the first aircraft;
   receiving the second broadcast message at the second aircraft;
   determining a second position of the second aircraft on the second aircraft from at least the receiving time data for the first broadcast message, the receiving time data and the delay time for each of the received reply messages, the positions of each of the plurality of ground transceivers, and the first position of the first aircraft contained in the second broadcast message; and
   transmitting a third broadcast message from the second aircraft comprising at least identity information and at least one of the first position and the second position of the second aircraft.

2. The method of claim 1, wherein the step of determining the first position of the first aircraft on the first aircraft further comprises the steps of:
   transmitting a broadcast message from each of at least one other aircraft, wherein the at least one other aircraft is not one of the first and second aircraft;
   receiving and recording the receiving time of the broadcast message from each of the at least one aircraft at a plurality of ground transceivers and at the first aircraft;
   transmitting a reply message to the broadcast message of each of the at least one other aircraft from the plurality of ground transceivers, wherein each reply message comprises at least ground transceiver identity and a delay time from receiving the broadcast message to transmitting the reply message for that ground transceiver; and
   determining the first position of the first aircraft on the first aircraft from at least the transmission time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, and the positions of each of the plurality of ground transceivers.

3. The method of claim 2, wherein the step of determining the first position of the first aircraft on the first aircraft further comprises the steps of:
   receiving at least mean-sea-level pressure data from at least one ground transceiver;
   determining a corrected altitude of the first aircraft using altitude sensor data on the first aircraft and the at least mean-sea-level (MSL) pressure data received from the at least one ground transceivers;
   determining the corrected altitude of each of the at least one other aircraft using altitude data received from each of the at least one other aircraft and the at least MSL pressure data received from the at least one ground transceivers;
   determining a velocity of the first aircraft using one of velocity sensor data on the first aircraft when a valid velocity output is available from a velocity sensor and position track data when the a valid velocity sensor output is not available;
   determining a velocity of each of the at least one other aircraft using one of velocity data received from each of the at least one other aircraft when valid velocity data is available from the received broadcast messages and position track data when valid velocity data is not available from the received broadcast messages;
   determining the first position of the first aircraft on the first aircraft from at least the transmission time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, the determined velocity data of the first aircraft, and each of the at least one other aircraft, and the corrected altitude data of the first aircraft, and each of the at least one other aircraft.

4. The method of claim 2, wherein the step of determining the first position of the first aircraft on the first aircraft further comprises the steps of:
receiving at least mean-sea-level pressure data from at least one ground transceiver;
determining a corrected altitude of the first aircraft and each of the at least one other aircraft using altitude data received from the first aircraft and each of the at least one other aircraft in the received broadcast messages and the at least mean-sea-level pressure data received from the at least one ground transceiver; and
determining the first position of the first aircraft and the velocity of the first aircraft and the velocity of each of the at least one other aircraft on the first aircraft from at least the transmission time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, and the corrected altitude data of the first aircraft, and each of the at least one other aircraft.

5. The method of claim 2, wherein the step of determining the first position of the first aircraft on the first aircraft further comprises determining a velocity of the first aircraft and a velocity of each of the at least one other aircraft.

6. The method of claim 2, wherein the step of determining the first position of the first aircraft on the first aircraft further comprises determining an integrity radius and an integrity level of the determined first position of the first aircraft, performing fault detection when at least one receiving time data more than is necessary to determine the first position is available, and excluding at least one of a faulty receiving time data and a faulty ground transceiver when a fault is detected and at least two receiving time data more than are necessary to determine the first position are available.

7. The method of claim 6, wherein at least one of determining the integrity radius, the integrity level, detecting the fault and excluding one of the faulty receiving time data and the faulty ground transceiver further comprises using range measurements obtained from Distance Measuring Equipment (DME).

8. The method of claim 1, wherein the step of determining the second position of the first aircraft and the first position of the second aircraft on the second aircraft further comprises the steps of:
transmitting a broadcast message from each of at least one other aircraft, wherein the at least one other aircraft is not one of the first and second aircraft;
receiving and recording the receiving time of the broadcast message from each of the at least one other aircraft at a plurality of ground transceivers and at the second aircraft;
transmitting a reply message to the broadcast message of each of the at least one other aircraft from the plurality of ground transceivers, wherein each reply message comprises at least ground transceiver identity and a delay time from receiving the broadcast message to transmitting the reply message for that ground transceiver; and
determining the second position of the first aircraft and the first position of the second aircraft on the second aircraft from at least the receiving time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, and the positions of each of the plurality of ground transceivers.

9. The method of claim 8, wherein the step of determining the second position of the first aircraft and the first position of the second aircraft on the second aircraft further comprises the steps of:
receiving at least mean-sea-level pressure data from at least one ground transceiver;
determining a corrected altitude of the second aircraft using altitude sensor data on the second aircraft and the at least mean-sea-level (MSL) pressure data received from the at least one ground transceiver;
determining a corrected altitude of the first aircraft and each of the at least one other aircraft using altitude data received from the first aircraft and each of the at least one other aircraft from the received broadcast messages and the at least MSL pressure data received from the at least one ground transceiver;
determining a velocity of the second aircraft using one of velocity sensor data on the second aircraft when a valid velocity output is available from a velocity sensor and position track data when a valid velocity sensor output is not available;
determining a velocity of the first aircraft and each of the at least one other aircraft using velocity data received from the first aircraft and each of the at least one other aircraft when valid velocity data is available from the received broadcast messages and position track data when the velocity data is not available from the received broadcast messages;
determining the second position of the first aircraft and the first position of the second aircraft on the second aircraft from at least the receiving time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, the determined velocity data of the first aircraft, the second aircraft, and each of the at least one other aircraft, and the corrected altitude data of the first aircraft, the second aircraft, and each of the at least one other aircraft.

10. The method of claim 8, wherein the step of determining the second position of the first aircraft and the first position of the second aircraft on the second aircraft further comprises the steps of:

receiving at least mean-sea-level pressure data from at least one ground transceiver;

determining a corrected altitude of the second aircraft using altitude sensor data on the second aircraft and the at least mean-sea-level (MSL) pressure data received from the at least one ground transceiver;

determining a corrected altitude of the first aircraft and each of the at least one other aircraft using altitude data received from the first and each of the at least one other aircraft in the received broadcast messages and the at least MSL pressure data received from the at least one or more ground transceiver; and determining the second position of the first aircraft, the first position of the second aircraft, and a velocity of the first aircraft, a velocity of the second aircraft, and a velocity of each of the at least one other aircraft on the second aircraft from at least the receiving time data for the first broadcast message, the receiving time data and the delay time for each of the received reply messages responding to the first broadcast message, the receiving time data for the broadcast message of each of the at least one other aircraft, the receiving time data and the delay time for each of the received reply messages responding to the broadcast message of each of the at least one other aircraft, the positions of each of the plurality of ground transceivers, and the corrected altitude data of the first aircraft, the second aircraft, and each of the at least one other aircraft.

11. The method of claim 8, wherein the step of determining the second position of the first aircraft and the first position of the second aircraft on the second aircraft further comprises determining a velocity of the first aircraft, a velocity of the second aircraft, and a velocity of each of the at least one other aircraft.

12. The method of claim 8, wherein the step of determining the second position of the first aircraft and the first position of the second aircraft on the second aircraft further comprises determining an integrity radius and an integrity level of the determined first position of the second aircraft, performing fault detection when at least one receiving time data more than is necessary to determine the first position is available, and excluding at least one of a faulty receiving time data and a faulty ground transceiver when a fault is detected and at least two receiving time data more than are necessary to determine the first position are available.

13. The method of claim 12, wherein at least one of determining the integrity radius, the integrity level, detecting the fault and excluding one of the faulty receiving time data and the faulty ground transceiver further comprises using range measurements obtained from Distance Measuring Equipment (DME).

14. The method of claim 1, wherein the step of determining the second position of the second aircraft on the second aircraft further comprises the steps of:

transmitting a broadcast message from each of at least one other aircraft, each broadcast message comprising at least the identity of that aircraft, wherein the at least one other aircraft is not one of the first and second aircraft;

receiving and recording the receiving time of the broadcast message from each of the at least one aircraft at a plurality of ground transceivers and at the second aircraft;

transmitting a reply message to the broadcast message of each of the at least one other aircraft from the plurality of ground transceivers, wherein each reply message comprises at least ground transceiver identity and a delay time from receiving the broadcast message to transmitting the reply message for that ground transceiver;

determining a first position of one of the at least one other aircraft on the one of the at least one other aircraft from at least the transmission time data for the broadcast message of the one of the at least one other aircraft, the receiving time data and the delay time for each of the received reply messages and the positions of each of the plurality of ground transceivers;

transmitting a broadcast message comprising at least the identity information and the first position of the one of the at least one other aircraft from the one of the at least one other aircraft;

receiving the broadcast message comprising at least the identity information and the first position of the one of the at least one other aircraft at the second aircraft; and determining the second position of the second aircraft on the second aircraft from at least the receiving time data for the first broadcast message, the receiving time data and the delay time for each of the received reply messages in responding to the first broadcast message, the positions of each of the plurality of the ground transceivers, the first position of the first aircraft contained in the second broadcast message, the receiving time data for the broadcast message comprising at least the identity of the one of the at least one other aircraft, the receiving time data and the delay time for each of the received reply messages responding to the broadcast message comprising at least the identity of the one of the at least one other aircraft, and the position of the one of the at least one other aircraft.

15. The method of claim 14, wherein the step of determining the second position of the second aircraft on the second aircraft further comprises the steps of:

receiving at least mean-sea-level pressure data from at least one ground transceiver;

determining a corrected altitude of the second aircraft using altitude sensor data on the second aircraft and the at least mean-sea-level (MSL) pressure data received from the at least one ground transceiver;

determining a corrected altitude of each of the at least one other aircraft using altitude data received from each of the at least one other aircraft in the received broadcast messages and the at least MSL pressure data received from the at least one ground transceiver;

determining a velocity of the second aircraft using velocity sensor data on the second aircraft when a valid velocity output is available from a velocity sensor and position track data when the velocity sensor output is not available;

determining a velocity of the first aircraft and each of the at least one other aircraft using velocity data received from the first aircraft and each of the at least one other aircraft when valid velocity data is available from the received broadcast messages and position track data when the velocity data is not available from the received broadcast messages; and determining the second position of the second aircraft on the second aircraft from at least the receiving time data for the first broadcast message, the receiving time data and the delay time for each of the received reply messages in responding to the first broadcast message, the positions of each of the plurality of the ground transceivers, the first position of the first aircraft contained in the second broadcast message, the receiving time data for the broadcast message comprising at least the identity of the one of the at least one other aircraft, the receiving time data and the delay time for each of the received reply messages responding to the broadcast message comprising at least the identity of the one of the at least one other aircraft, the position of the one of the at least one other aircraft, the velocity data of the first aircraft, the second aircraft, and each of the at least one other aircraft, and the corrected altitude data of the second aircraft and each of the at least one other aircraft.

16. The method of claim 14, wherein the step of determining the second position of the second aircraft on the second aircraft further comprises the steps of:
receiving at least mean-sea-level pressure data from at least one ground transceiver;
determining a corrected altitude of the second aircraft using altitude sensor data on the second aircraft and the at least mean-sea-level (MSL) pressure data received from the at least one ground transceiver;
determining a corrected altitude of each of the at least one other aircraft using altitude data received from each of the at least one other aircraft in the received broadcast messages and the at least MSL pressure data received from the at least one ground transceiver; and
determining the second position of the second aircraft, a velocity of the first aircraft, a velocity of the second aircraft, and a velocity of each of the at least one other aircraft on the second aircraft from at least the receiving time data for the first broadcast message, the receiving time data and the delay time for each of the received reply messages in responding to the first broadcast message, the positions of each of the plurality of the ground transceivers, the first position of the first aircraft contained in the second broadcast message, the receiving time data for the broadcast message comprising at least the identity of the one of the at least one other aircraft, the receiving time data and the delay time for each of the received reply messages responding to the broadcast message comprising at least the identity of the one of the at least one other aircraft, the position of the one of the at least one other aircraft, and the corrected altitude data of the first aircraft, the second aircraft, and each of the at least one other aircraft.

17. The method of claim 14, wherein the step of determining the second position of the first aircraft and the first position of the second aircraft on the second aircraft further comprises determining a velocity of the first aircraft, a velocity of the second aircraft, and a velocity of each of the at least one other aircraft.

18. The method of claim 14, wherein the step of determining the second position of the second aircraft on the second aircraft further comprises determining an integrity radius and an integrity level of the second position of the second aircraft, performing fault detection when at least one receiving time data more than is necessary to determine the second position is available, excluding at least one of a faulty receiving time data and a faulty ground transceiver when a fault is detected and at least two receiving time data more than are necessary to determine the second position are available, and excluding a faulty aircraft position data when a fault is detected and at least two aircraft transmitting broadcast messages to which reply message from the plurality of ground-transceivers are transmitted and are received by the second aircraft more than are necessary to determine the second position are available.

19. The method of claim 18, wherein at least one of determining the integrity radius, the integrity level, detecting the fault and excluding one of the faulty receiving time data and the faulty ground transceiver further comprises using range measurements obtained from Distance Measuring Equipment (DME).

20. The method of claim 1, wherein the step of determining the first position of the first aircraft on the first aircraft further comprises the steps of:
determining a barometric altitude of the first aircraft using a barometric sensor;
receiving at least mean-sea-level barometric pressure data from at least one ground transceiver;
calculating a corrected altitude of the first aircraft using the at least mean-sea-level barometric pressure data and the determined barometric altitude of the first aircraft;
determining the first position of the first aircraft on the first aircraft from at least the transmission time data for the first broadcast message, the receiving time data and the delay time for each of the received reply messages, the positions of each of the plurality of ground transceivers, and the corrected altitude of the first aircraft.

21. The method of claim 1, wherein the step of determining the second position of the first aircraft and the first position of the second aircraft on the second aircraft further comprises the steps of:
determining a barometric altitude of the second aircraft using a barometric sensor;
determining a barometric altitude of the first aircraft from messages transmitted by the first aircraft;
receiving at least mean-sea-level barometric pressure data from at least one ground transceiver;
calculating a corrected altitude for each of the first aircraft and the second aircraft using the at least mean-sea-level barometric pressure data and the determined barometric altitude for each of the first aircraft and the second aircraft;
determining the second position of the first aircraft and the first position of the second aircraft on the second aircraft from at least the receiving time data for the first broadcast message, the receiving time data and the delay time for each of the received reply messages, the positions of each of the plurality of ground transceivers, and the corrected altitude data of the first aircraft and the second aircraft.

22. The method of claim 1, wherein the step of determining the second position of the second aircraft on the second aircraft further comprises the steps of:
determining a barometric altitude of the second aircraft using a barometric sensor;
receiving at least mean-sea-level barometric pressure data from at least one ground transceiver;
calculating a corrected altitude of the second aircraft using the at least mean-sea-level barometric pressure data and the determined barometric altitude;
determining the second position of the second aircraft on the second aircraft from at least the receiving time data for the first broadcast message, the receiving time data and the delay time for each of the received reply messages, the positions of each of the plurality of ground transceivers, the first position of the first aircraft contained in the second broadcast message, and the corrected altitude of the second aircraft.

23. The method of claim 1, wherein the step of transmitting a reply message to the first broadcast message from each of the plurality of ground transceivers further comprises the steps of:
incrementing a message counter value for each reply message transmitted;
recording a delay time of each reply message transmitted and associating the delay time with the message counter value; and adding to the reply message a first message counter value associated with a current reply message;

adding to the reply message a delay time and a second message counter value of the reply message that is associated with the delay time.

24. The method of claim 1, wherein the step of receiving and recording the receiving time of the reply messages transmitted by each of the plurality of ground transceivers at the first aircraft and the second aircraft further comprises the steps of:

determining the clock frequency offset and frequency drift of each of the first aircraft and the second aircraft using at least one of GPS position data and GPS pulse-per-second (PPS) data when GPS is available; and correcting the recorded receiving time of the reply messages on the first aircraft using the determined clock frequency offset, clock frequency drift, and the recorded time of transmission of the first broadcast message.

25. The method of claim 1, the step of determining the first position of the first aircraft on the first aircraft further comprises determining an integrity radius and an integrity level of the determined first position, performing fault detection when at least one receiving time data more than is necessary to determine the first position is available, and excluding at least one of a faulty receiving time data and a faulty ground transceiver when a fault is detected and at least two receiving time data more than are necessary to determine the first position are available.

26. The method of claim 25, wherein at least one of determining the integrity radius, the integrity level, detecting the fault and excluding one of the faulty receiving time data and the faulty ground transceiver further comprises using range measurements obtained from Distance Measuring Equipment (DME).

27. The method of claim 1, wherein the step of determining the second position of the first aircraft and the first position of the second aircraft on the second aircraft further comprises determining an integrity radius and an integrity level of the determined first position of the second aircraft, performing fault detection when at least one receiving time data more than is necessary to determine the first position is available, and excluding at least one of a faulty receiving time data and a faulty ground transceiver when a fault is detected and at least two receiving time data more than necessary to determine the first position are available.

28. The method of claim 27, wherein at least one of determining the integrity radius, the integrity level, detecting the fault and excluding one of the faulty receiving time data and the faulty ground transceiver further comprises using range measurements obtained from Distance Measuring Equipment (DME).

29. The method of claim 1, wherein the step of determining the second position of the second aircraft on the second aircraft further comprises determining an integrity radius and an integrity level of the determined second position of the second aircraft and performing fault detection when at least one receiving time data more than is necessary to determine the second position is available.

30. The method of claim 29, wherein at least one of determining the integrity radius, the integrity level, detecting the fault and excluding one of the faulty receiving time data and the faulty ground transceiver further comprises using range measurements obtained from Distance Measuring Equipment (DME).

31. The method of claim 1, further comprising the steps of:
determining a third position of the first aircraft on the first aircraft using a Global Positioning System (GPS);

determining a difference between the determined first position and the determined third position of the first aircraft on the first aircraft; and determining a validity of the determined third position and the determined first position of the first aircraft using the determined difference.

32. The method of claim 1, further comprising the steps of:
determining a third position of second aircraft on the second aircraft using a Global Positioning System (GPS);

determining a first difference between the determined first position and the determined third position of the second aircraft on the second aircraft;

determining a second difference between the determined second position and the determined third position of the second aircraft on the second aircraft;

determining a third difference between the determined second position and the determined first position of the second aircraft on the second aircraft; and determining a validity of the first, second, and third positions of the second aircraft using the determined first difference, the determined second difference, and the determined third difference.

33. The method of claim 1, further comprising the steps of:
receiving another broadcast message from the first aircraft on the second aircraft, the another broadcast message comprising at least identify information and another position of the first aircraft;

determining a difference between the second position of the first aircraft and the another position of the first aircraft in the another broadcast message; and determining a validity of the position of the first aircraft in the another broadcast message using the determined difference.

34. The method of claim 1, further comprises the steps of:
receiving and recording the receiving time of a broadcast message that is not the first broadcast message from an aircraft at a plurality of ground transceivers;

determining the propagation time from the aircraft to each of the ground transceivers using at least the data of the position of the aircraft and the position of each of the ground transceivers;

determining a difference in the propagation time from the aircraft to each pair of the ground transceivers;

determining a difference in the recorded receiving time of the each pair of the ground transceivers;

determining a difference between the difference in the propagation time and the difference in the recorded receiving time of the each pair of ground transceivers;

selecting a ground transceiver from the plurality of ground transceivers as a reference ground transceiver;

correcting the clock of each of the ground transceivers that is not the reference ground transceiver using the determined difference between the difference in the propagation time and the difference in the recorded receiving time;

transmitting a time broadcast message from each of the plurality of ground transceivers, the time broadcast message comprising at least the identity information and the transmitting time based on the corrected clock of that ground transceiver;

receiving and recording the receiving time of the time broadcast message from each of the ground transceivers at an aircraft;

determining a position of the aircraft that receives the time broadcast messages on the aircraft using at least the recorded receiving time of each of the time broadcast messages and the position of each of the ground transceivers when the position of the aircraft is unknown and determining a clock bias of the aircraft using at least the recorded the receiving time of each of the time broadcast messages, the position of each of the ground transceivers, and the position of the aircraft when the position of the aircraft is known.

35. The method of claim 34 further comprises the steps of:
synchronizing the clock of the reference ground transceiver to Universal Time Coordinated (UTC);
correcting the clock of each of the ground transceivers that are not the reference ground transceiver and the clock of each of the ground transceivers is synchronized to UTC;
correcting the clock of each of the aircraft and the clock of each of the aircraft is synchronized to UTC.

36. A method of aircraft navigation using at least one broadcast message, the method comprising the steps of:
transmitting and recording a transmission time of a first broadcast message at a first aircraft of a plurality of aircraft, the first broadcast message comprising at least identity information of the first aircraft;
receiving and recording a receiving time of the first broadcast message from the first aircraft at a plurality of ground transceivers and at a second aircraft;
transmitting a reply message to the first broadcast message from each of the plurality of ground transceivers, wherein each reply message comprises at least identity information of that ground transceiver and a delay time from receiving the first broadcast message to transmitting the reply message for that ground transceiver;
receiving and recording a receiving time of the reply messages transmitted by each of the plurality of ground transceivers at the first aircraft and the second aircraft; and
determining a first position of the first aircraft and a first position of the second aircraft on the second aircraft from at least the receiving time data for the first broadcast message, the receiving time data and the delay time for each of the received reply messages, and the positions of each of the plurality of ground transceivers.

37. A method of aircraft navigation using at least one broadcast message, the method comprising the steps of:
transmitting and recording a transmission time of a first broadcast message at a first aircraft of a plurality of aircraft, the first broadcast message comprising at least identity information of the first aircraft;
receiving and recording a receiving time of the first broadcast message from the first aircraft at a plurality of ground transceivers and at a second aircraft;
transmitting a reply message to the first broadcast message from each of the plurality of ground transceivers, wherein each reply message comprises at least identity information of that ground transceiver and a delay time from receiving the first broadcast message to transmitting the reply message for that ground transceiver;
receiving and recording a receiving time of the reply messages transmitted by each of the plurality of ground transceivers at the first aircraft and the second aircraft;
determining a first position of the first aircraft on the first aircraft from at least the transmission time data for the first broadcast message, the receiving time data and the delay time for each of the received reply messages and the positions of each of the plurality of ground transceivers;
determining a second position of the first aircraft and a first position of the second aircraft on the second aircraft from at least the receiving time data for the first broadcast message, the receiving time data and the delay time for each of the received reply messages, and the positions of each of the plurality of ground transceivers;
transmitting a second broadcast message from the first aircraft comprising at least the identity information and the first position of the first aircraft;
receiving the second broadcast message at the second aircraft; and
determining a second position of the second aircraft on the second aircraft from at least the receiving time data for the first broadcast message, the receiving time data and the delay time for each of the received reply messages, the positions of each of the plurality of ground transceivers, and the first position of the first aircraft contained in the second broadcast message.

* * * * *